United States Patent
Kikinis

(10) Patent No.: US 10,552,556 B2
(45) Date of Patent: Feb. 4, 2020

(54) SYSTEM AND METHOD FOR PERFORMANCE TESTING OF SCALABLE DISTRIBUTED NETWORK TRANSACTIONAL DATABASES

(71) Applicant: Liquineq AG, Zug (CH)

(72) Inventor: Dan Kikinis, Los Altos, CA (US)

(73) Assignee: LIQUINEQ AG, Zug (CH)

( * ) Notice: Subject to any disclaimer, the term of this patent is extended or adjusted under 35 U.S.C. 154(b) by 0 days.

(21) Appl. No.: 16/208,853

(22) Filed: Dec. 4, 2018

(65) Prior Publication Data
US 2019/0140935 A1 May 9, 2019

Related U.S. Application Data

(63) Continuation-in-part of application No. 16/152,090, filed on Oct. 4, 2018, which is a continuation-in-part
(Continued)

(51) Int. Cl.
*G06F 17/50* (2006.01)
*G06F 16/182* (2019.01)
(Continued)

(52) U.S. Cl.
CPC ........ *G06F 17/5009* (2013.01); *G06F 16/182* (2019.01); *G06F 16/1805* (2019.01); *H04L 9/0643* (2013.01); *H04L 2209/38* (2013.01)

(58) Field of Classification Search
CPC .................... H04L 2209/38; G06F 17/5009
See application file for complete search history.

(56) References Cited

U.S. PATENT DOCUMENTS

| | | |
|---|---|---|
| 8,850,393 B2 | 9/2014 | Castro |
| 8,977,903 B1 | 3/2015 | Chandrasekharapuram et al. |

(Continued)

FOREIGN PATENT DOCUMENTS

| | | |
|---|---|---|
| CN | 106598824 A | 4/2017 |
| WO | 2017187395 A1 | 11/2017 |

OTHER PUBLICATIONS

Pongnumkul et al.; "Performance Analysis of Private Blockchain Platforms in Varying Workloads"; Jul. 2017 ICCCN.*
(Continued)

*Primary Examiner* — Grace Park
(74) *Attorney, Agent, or Firm* — Brian R. Galvin; Galvin Patent Law LLC

(57) ABSTRACT

A system for performance testing of scalability implementations and testing of stability in blockchain database implementations. The testing system comprises a cluster of private blockchain nodes instantiated on a network and a control console that allows the user to set the number of nodes in the network and the number of clients for testing of a particular blockchain implementation. Performance metrics are established and tested. The test system allows for staged testing using generated databases, wallets, and accounts starting with simple 5-node networks, expanding to larger networks, then testing with decreased block validation times, continuing to testing using alternative, faster trust schemes, then testing implementation on divided blockchains, and finally testing on shared blockchains.

2 Claims, 22 Drawing Sheets

Related U.S. Application Data of application No. 16/122,870, filed on Sep. 5, 2018, now abandoned.

(60) Provisional application No. 62/594,519, filed on Dec. 4, 2017, provisional application No. 62/570,064, filed on Oct. 9, 2017, provisional application No. 62/554,546, filed on Sep. 5, 2017, provisional application No. 62/549,138, filed on Aug. 23, 2017, provisional application No. 62/547,227, filed on Aug. 18, 2017, provisional application No. 62/540,943, filed on Aug. 3, 2017.

(51) Int. Cl.
*H04L 9/06* (2006.01)
*G06F 16/18* (2019.01)

(56) References Cited

U.S. PATENT DOCUMENTS

| | | |
|---|---|---|
| 2015/0371224 A1 | 12/2015 | Lingappa |
| 2017/0005804 A1 | 1/2017 | Zinder |
| 2017/0103385 A1 | 4/2017 | Wilson, Jr. et al. |
| 2017/0214675 A1 | 7/2017 | Johnsrud et al. |
| 2017/0337534 A1 | 11/2017 | Goeringer et al. |
| 2018/0300382 A1 | 10/2018 | Madisetti et al. |
| 2018/0349621 A1* | 12/2018 | Schvey .................. G06F 21/40 |
| 2019/0123892 A1* | 4/2019 | Basu .................... H04L 67/1059 |

OTHER PUBLICATIONS

Tien Tuan Anh Dinh et al. "Blockbench: A Framework for Analyzing Private Blockchains", SIGMOD 17, May 14-19, 2017, Chicago, IL, USA, available at URL: https://www.comp.nus.edu.sg/~ooibc/blockbench.pdf.

* cited by examiner

SYSTEM AND METHOD FOR PERFORMANCE TESTING OF SCALABLE DISTRIBUTED NETWORK TRANSACTIONAL DATABASES

CROSS-REFERENCE TO RELATED APPLICATIONS

This application claims the benefit of, and priority to, U.S. provisional patent application No. 62/594,519, titled "SYSTEM AND METHOD FOR CONCEPT OF HIGH-PERFORMANCE SCALABILITY", filed on Dec. 4, 2017, and is also a continuation-in-part of Ser. No. 16/152,090, titled "SYSTEM AND METHOD FOR MULTI-TIERED DISTRIBUTED NETWORK TRANSACTIONAL DATABASE", filed on Oct. 4, 2018, which claims the benefit of, and priority to, U.S. provisional patent application No. 62/570,064, titled "MULTI-TIER BLOCKCHAIN-BASED REGIONALIZED CRYPTOCURRENCY SOLUTION", filed on Oct. 9, 2017, and is also a continuation-in-part of Ser. No. 16/122,870, titled "SYSTEM AND METHOD FOR MULTI-TIERED DISTRIBUTED NETWORK TRANSACTIONAL DATABASE", filed on Sep. 5, 2018, which claims the benefit of, and priority to, U.S. provisional patent application No. 62/554,546, titled "MULTI-TIER BLOCKCHAIN-BASED REGIONALIZED CRYPTOCURRENCY SOLUTION", filed on Sep. 5, 2017, and claims the benefit of, and priority to, U.S. provisional patent application No. 62/540,943, titled "System and Method for Enhanced Cybercurrency Transactions", filed on Aug. 3, 2017, and claims the benefit of, and priority to, U.S. provisional patent application No. 62/547,227, titled "System and Method for Enhanced Cybercurrency Transactions", filed on Aug. 18, 2017, and claims the benefit of, and priority to, U.S. provisional patent application No. 62/549,138, titled "System and Method for Enhanced Cybercurrency Transactions", filed on Aug. 23, 2017, the entire specifications of each of which are incorporated herein by reference in their entirety.

BACKGROUND

Field of the Art

The disclosure relates to the field of computer databases and more particularly to the field of distributed network databases.

Discussion of the State of the Art

"Blockchain" is the name given to a new type of database that is distributed, unmanaged, secure, and publicly viewable. Blockchain databases differ from traditional databases in several respects. First, traditional databases must be managed, and typically have a single managing authority that has authorization to make changes to the database. Blockchain databases are unmanaged, meaning that there is no single managing authority, and changes to the database are done by consensus of computers that validate new entries in the database. Second, traditional databases are typically closed to public view, primarily because they are managed and usually held by a single managing authority. As a result, information contained in a traditional database can be held in secret, provided that appropriate security measures are in place. Blockchain databases, on the other hand, are by their nature open to public view. In fact, it is this very public availability that is one of the defining characteristics of a blockchain database. The fact that they are open to public view allows them to be managed by consensus about the validity of new entries (even where the identities of the participants in the entry are not disclosed). Third, earlier entries in traditional databases are changeable unless locked or protected by some means, usually by the managing authority, who can override such protections. In blockchain databases, prior validated transactions cannot be changed without invalidating the entire database. Blockchain databases are immutable by design to provide a tamper-proof database history, and can only be changed by adding new transactions to the database. Lastly, traditional databases are searchable, such that older entries can be found by entering some sort of query and having the computer search the database for matches. Blockchain databases, on the other hand, are encrypted and cannot be searched without knowing very specific information such as block height, hash, transaction id, etc.

These differences in function of traditional databases versus blockchain databases have enabled new functionality such as secure, largely anonymous, decentralized transactions, but the new functionality comes with significant limitations. Blockchain databases grow larger in size as they are used, making the processing times for adding new entries longer and longer. With currently-existing blockchain databases, the processing time for adding new transactions can be half an hour, or more, which creates substantial problems in some applications. There exist some ideas for scaling blockchain databases to improve their performance, but there is currently no system for performance testing such of such scaling.

What is needed is a system for performance testing of scalability implementations and testing of stability in blockchain databases.

SUMMARY

Accordingly, the inventor has conceived and reduced to practice a system for performance testing of scalability implementations and testing of stability in blockchain database implementations.

The testing system comprises a cluster of private blockchain nodes instantiated on a server, likely a cloud-based system, and a control console that allows the user to set the number of nodes in the network and the number of clients for testing of a particular blockchain implementation. Performance would be measured in terms of transactions/second with testing of time to system stability. The test system allows for staged testing using generated databases, wallets, and accounts starting with simple 5-node networks, expanding to larger networks, then testing with decreased block validation times, continuing to testing using alternative, faster trust schemes, then testing implementation on divided blockchains, and finally testing on shared blockchains.

According to a preferred embodiment, a system for testing of divided blockchains is disclosed, comprising: a computer network comprising a plurality of connected computer systems, each computer system comprising at least one processor, a memory, and a plurality of programming instructions stored in the memory which, when operating on the at least one processor, cause the at least one processor to: instantiate a plurality of blockchain nodes on at least one computer system in the computer network; assign one of the nodes to be the lead node for processing of blocks; generate or import simulated accounts, wallets, tokens, and transactions; load an implementation of at least one shard of a divided blockchain for testing; run a simulation of activity on the at least one shard of the divided blockchain using the instantiated nodes and the simulated accounts, wallets, tokens, and transactions; test the performance of the simulation using at least one performance metric.

According to another preferred embodiment, a method for testing of divided blockchains is disclosed, comprising the steps of: instantiating a plurality of blockchain nodes on at least one computer system in the computer network; assigning one of the nodes to be the lead node for processing of blocks; generating or import simulated accounts, wallets, tokens, and transactions; loading an implementation of at least one shard of a divided blockchain for testing; running a simulation of activity on the at least one shard of the divided blockchain using the instantiated nodes and the simulated accounts, wallets, tokens, and transactions; testing the performance of the simulation using at least one performance metric.

According to an aspect of an embodiment, in case of loss of connectivity to the lead node, one of the remaining nodes immediately takes over as new lead node based on a protocol for consensus of the remaining nodes.

According to an aspect of an embodiment, a new division is created in a divided blockchain once an existing division reaches a pre-determined size.

According to an aspect of an embodiment, sub-divided blockchains are maintained within at least one division of a divided blockchain.

According to an aspect of an embodiment, a new sub-division is created in a sub-divided blockchain once an existing sub-division reaches a pre-determined size.

According to an aspect of an embodiment, older sub-divisions are consolidated after a pre-defined period of time.

According to an aspect of an embodiment, testing is completed in phases, with each phase introducing additional load, reduced time for completion, or complexity.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
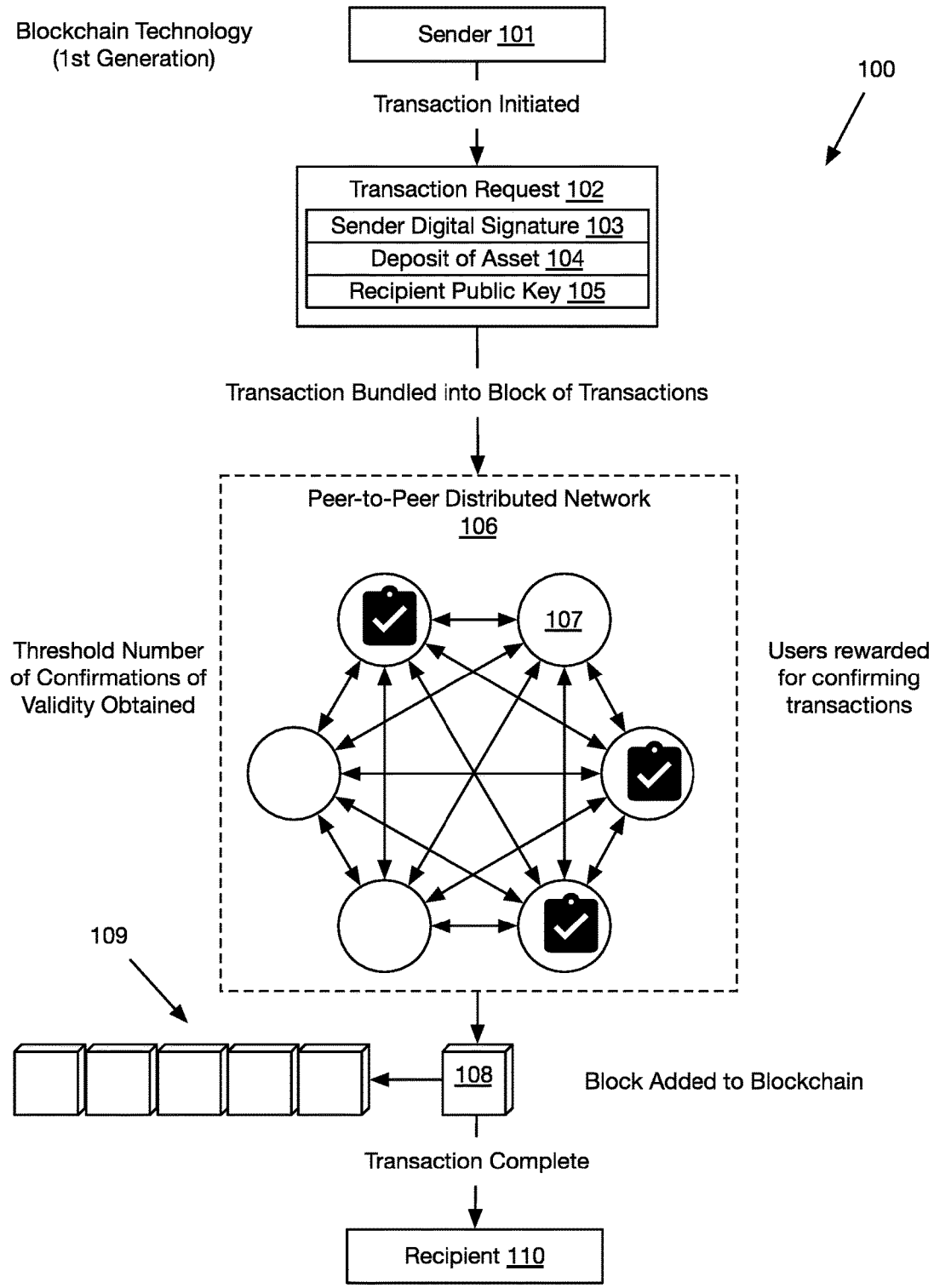
FIG. 1 (PRIOR ART) is a diagram illustrating the operation of existing cryptocurrencies using blockchain technology.

The inventor has conceived, and reduced to practice, a system for performance testing of scalability implementations and testing of stability in blockchain database implementations.

By using a set of high-performance scalability tests, users can quickly establish a repeatable test infrastructure to validate the performance and scaling goals for such a system. Further, they can build a system that they can use to understand and design the final product and can show to potential partners and investors. Robust testing of product design, can be achieved by building the system in phases, using the same generated dataset as input for each phase, and measuring performance of each phase in a repeatable way. This test system can help designers overcome problems in first and second generation blockchain databases (for example, cryptocurrencies) that slow transaction validation and limit their growth for mainstream use, such as widespread adoption in everyday activities as credit cards or cash are used today.

Definitions

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

The term "cryptocurrency" as used herein includes not only its classic meaning but can also mean a representation of value in digitized form, secured by encryption, which may be transferred to others or exchanged with others for goods and services. Cryptocurrencies are typically not associated with a governmental authority, although it would be possible for a governmental authority to issue one. The definition of a cryptocurrency does not necessarily require distributed, unmanaged tracking and processing, although all major cryptocurrencies currently in use are so defined. Cryptocurrencies are often referred to a digital currencies or virtual currencies, and the valuation associated with cryptocurrencies is often referred to as coins or tokens, with fractional parts of a coin or token typically being allowed to be transferred or utilized.

The term "divided blockchain" as used herein means a blockchain that has been divided into parts such as by sharding, dividing, sectioning, demarcating, tiering, compartmentalizing, segmenting, or otherwise. Sharding is one method of creating divided blockchains.

The phrase "functional area" as used herein means any industry, grouping, association, political region (for example special economic zone), type of work, or other field of human endeavor, which may or may not correspond to a geographical area.

The phrase "geographical area" as used herein is used in its common meaning as any demarcated area of the Earth. Geographical areas are often, but not always, defined by agreed-upon borders such as between countries, states, counties, and cities.

"Machine learning" as used herein is an aspect of artificial intelligence in which the computer system or component can modify its behavior or understanding without being explicitly programmed to do so. Machine learning algorithms develop models of behavior or understanding based on information fed to them as training sets, and can modify those models based on new incoming information. An example of a machine learning algorithm is AlphaGo, the first computer program to defeat a human world champion in the game of Go. AlphaGo was not explicitly programmed to play Go. It was fed millions of games of Go, and developed its own model of the game and strategies of play.

The terms "mine" or "mining" as used herein mean incentivizing nodes to provide computer processing power to validate transactions by generating a small additional portion of the valuation associated with a blockchain database for each successful entry validation in that database, and giving that small portion to a node or nodes that perform(s) the successful entry validation.

The term "node" as used herein means any one of a plurality of computers that validate transactions in the blockchain database as part of a peer-to-peer network.

The term "proof of stake" or "PoS" as used herein means placing at stake a portion of a node's holdings in a cryptocurrency as evidence of that node's trustworthiness to validate transactions on a shard of a blockchain. Upon successfully validating a transaction, the staker may earn part or whole of the transaction fees. The larger the holdings a node places at stake and the longer the duration of the stake, the higher is the number of transactions the node gets to validate. In sharded blockchains, each node only has information about the blockchain for a shard in which it participates, so proof of work as a means for providing trust and security can't be used. Using PoS for sharded blockchains allows for scalability and speed of performance of blockchain transactions.

The term "proof of work" or "PoW" as used herein means solving of a complex mathematical operation such as a cryptographical puzzle which serves as validation of a potential block in the blockchain. In current blockchain implementations, PoW requires broadcasting of the potential block to every node in the network and competition among the nodes to complete the PoW first. This requires every node to have the entire information on the blockchain. As the blockchain grows, with more users and a higher number of transactions, there is increasing load on each node. Participation of every participating node in transaction validation makes the transaction process slower.

The phrase "real currency" (aka fiat money) as used herein means the official currency of a country, region, or other globally-recognized governmental entity. For example, the U.S. dollar is the official currency of the country of the United States of America, the Euro is the official currency of the region of the European Union, and the Scottish bank notes are an officially recognized currency in Scotland, notwithstanding the fact that they are tied to the value of the British Pound.

The term "shard" as used herein mean a part of a blockchain upon which a subset of nodes in the network maintain and validate that part of the blockchain.

The term "sharding" as used herein means a method of increasing scalability of processing of blockchain transactions comprising the division of a blockchain into separate parts, or shards, so that every node validating the blockchain does not need to have a copy of the entire blockchain, and so that validations do not need to be sent to every node in the network. In sharding, the blockchain is divided into separate parts, and each node will only have a portion of the blockchain (the shard with which it is associated). Nodes associated with a shard maintain information only on that shard in a shared manner so that, within a shard, the decentralization is still maintained.

The term "sub-divided blockchain" as used herein means a portion of a divided blockchain that has been further divided into parts such as by sharding, dividing, sectioning, demarcating, tiering, compartmentalizing, segmenting, or otherwise. Sharding is one method of creating sub-divided blockchains.

Unmanaged, distributed network, transactional databases (commonly known as "blockchain" databases) can be used to facilitate transactions in a manner that was previously not possible: they allow transactions between users without any form of centralized authority that has control over those transactions. The keys to this new technology are encryption, which allows security of the transaction, and distributed public confirmation, which allows trust in the validity of the transaction. There are innumerable uses for this new technology, such as transferring money, creating automatically-executing contracts, forming and automatically executing escrow transactions, etc. In fact, any asset that can be represented in digital form can be transferred or exchanged using blockchain databases.

The first, and still most common, use of blockchain databases was to enable the use of cryptocurrencies without a centralized controlling authority. However, while blockchain databases have significant advantages for use in cybercurrencies, they also have serious drawbacks, which continue to plague the cybercurrencies that use blockchain. As the blockchain for a given cybercurrency gets longer, transactions can take half an hour, or more, to reach a critical number of confirmations for validation of the transaction in the peer-to-peer network that manages the blockchain. This latency in concluding a transaction leads to substantial uncertainty about the value of the transaction until it is finalized. Combined with the current volatility of some cybercurrencies, this can lead to large fluctuations in value between the time that a transaction is initiated and the time that it is finalized. This valuation uncertainty is a problem for all sizes of transactions, but makes very small transactions particularly unattractive. For example, using existing blockchain-based cybercurrencies, buying a cup of coffee would be problematic. Not only would the buyer and seller need to wait on the order of half and hour for the transaction to complete, the cybercurrency equivalent of two dollars sent by the buyer could end up being the equivalent of three dollars by the time that the transaction is confirmed and finalized. Thus, each party to a transaction may gain or lose a large amount of the value of the transaction in the time required to complete the transaction.

Cybercurrencies, as they currently exist, are monolithic, which is to say that they are global, single-tier, single-unit currencies. They are global in the sense that there are no regional restrictions on transactions. Anyone with a computer anywhere in the world can make a transaction with anyone else anywhere in the world. They are single-tier in the sense that there are no higher or lower tiers of cybercurrency within the same system for which they can be traded or exchanged. They are single-unit in that there is a denominated unit (often referred to as a "coin" or "token") which is the unit of value for all transactions. Fractions of a denominated unit may be transferred, but the denominated unit never changes.

The problem with monolithic cybercurrencies is that the time for processing of transactions grows as the blockchain upon which they are built grows. In certain cybercurrencies currently in use, the processing time for transactions can half an hour, or more. This is the time required to reach a critical number of confirmations for validation of the transaction in the peer-to-peer network that manages the blockchain. The longer the cybercurrency is in operation, the larger the blockchain grows, and the longer the latency becomes between the initiation of a transaction and its finalization.

This latency makes certain transactions untenable for time reasons. This is particularly the case for small transactions where the buyer and seller would not ordinarily stand around waiting for the transaction to complete. For example, in buying a cup of coffee, the buyer and seller expect to conclude the transaction within a few seconds, or within a minute or two at the most. The buyer orders the coffee, makes the payment, and the seller hands the buyer the coffee, all within a minute or two. Having to wait half an hour or more for the transaction to complete makes this sort of small value transaction untenable.

This latency also makes certain transactions untenable for valuation reasons. A long latency creates uncertainty in concluding a transaction leads to substantial uncertainty about the value of the transaction until it is finalized. The longer the latency and the higher the volatility of the cybercurrency, the more uncertainty is created in value, and the less tenable a cybercurrency is for making that transaction. This problem exists for transactions of all values, but for larger transactions, the parties involved may be willing to take the risk of fluctuation for any number of reasons (e.g., the value to them of making an anonymous transaction may be higher than making the transaction using other types of currency). For smaller transactions, the reasons for taking the risk of value fluctuation are largely eliminated. For example, in the example of the purchase of a cup of coffee, there is little reason for either of the parties involved to care whether the transaction is anonymous. Since cybercurrencies can be extremely volatile, a half hour latency can cause the parties to a transaction to gain or lose a large amount of the value of the transaction in the time required to complete the transaction.

In one embodiment, the multi-tiered blockchain database system can be used to improve the viability of small value cybercurrency transactions. The improvement involves creating multiple tiers within the cybercurrency with characteristics that reduce the latency between the initiation and finalization of transactions, such that waiting times and risk of value fluctuation for both the buyer and seller are reduced to acceptable levels for small value transactions.

In certain embodiments, a cybercurrency system may be enhanced to reduce these latencies by including one or more tiers in which transactions are limited to those of a lesser denomination, with a limited number of ledger transacting nodes and a limited number of gateways interacting between the general area of unlimited currency and the demarcated area. In some embodiments, the tiers may represent different tiers of currency may be issued, and exchanges of cybercurrency among the tiers may be allowed. In some embodiments, the tiers may be limited to a certain geographical region, where the cybercurrency in that section may be traded at a fixed rate to another currency in the same area, which may be a real currency rather on a major cryptocurrency. In some such embodiments, a central issuer, or bank, with a reserve, may be allowed stabilize the cybercurrency or to tie the value of the cybercurrency to the local real currency. In some embodiments, so called "mixer wallets" containing more than one cryptocurrency may be blocked or confiscated to avoid misuse of funds for illegitimate purposes.

In one embodiment, lower tiers of cryptocurrency would be restricted in in a number of ways. Lower tiers of cryptocurrency would be allowed to handle only fractional currency, that is, currency that is a fraction of a whole currency unit, usually equivalent to coins. The machines that process transactions in lower tiers of cryptocurrency could process only in their own region, and only fractional transactions. Also, because only fractional transactions of fractional currency occur in these lower tier currencies, no currency mining could occur, because no mining is allowed in these lower tier currencies. If a user wants to change the between tiers, the currency would be reserved via gateways and blocked into the ledger in the main region and transferred into the lower region and made available as fractional currency. A small portion of any transfer would be allocated to the operators of the ledger machines in each region to pay operating costs. With no mining occurring in the regions, and with the regions being regionally limited in range, the cost of operation would be much lower. Also, the local fractional currency could be, for example, bound to a local physical currency such as, for example, the U.S. dollar or the Euro, rather than to a cybercurrency such as Bitcoin or Ether, so there might be a local master currency available, issued by the conversion gateway, which would be paid for by currency in the upper domain and then actually converted by the gateways into a local physical currency. Those gateways might act as central banks, rather than as gateways, issuing a fractional currency only. Thus the transactions may be made faster and less vulnerable to currency fluctuations.

In some embodiments, the ledgers may be split by years, with the current ledgers containing only transaction for the current year or two, and all previous transactions kept in archived ledgers, accessed only if a user has a wallet with an old balance. In such a case, as soon as the user wants to use the old balance, the wallet is retrieved from the archive, updated, and removed from the archive. Thus archived wallets may take a little longer to transact, but current wallets are much faster, because the ledger is kept current only in the ledger currency. Because the ledgers are regionalized, they can be much smaller and thus process transactions much more quickly.

It is important to note that the regionalization of lower tier currencies does not mean a ledger is limited to one country. For example, in North America, each region could contain a piece of Canada, the United States, and Mexico. Thus, including multiple jurisdictions could avoid putting a region under the control of just one country. Wallets could simultaneously contain the physical currency of multiple regions, such as, for example, Euros, dollars, and yen. Most people spend currency in their home region, so merchants could execute transactions much more cheaply, because of the reduced risk of currency fluctuations in most cases.

Further, in some embodiments, when liquidity runs below a certain level, due to large outflow, a program or an AI module in the system can take at least one of several countermeasures: a) it can change exchange rate to reduce outflow, b) it can offer an interest for delaying a conversion, or c) it makes a cash call on certain members of a reserve group to allow a larger reserve to be built up quickly and thus maintain liquidity. This process can be triggered in an automated way by software and or an AI supervisory module (not shown) running as part of the management software of the system on at least one of the servers or as part of the EVM system (or similar) or both.

In some embodiments, enhancements to existing blockchain technology may be used to reduce the latency associated with current cryptocurrency systems. In currently existing cryptocurrencies, the blockchains used as transaction ledgers are never retired or archived, leading to increasingly-long block chains, and slow processing times in the peer-to-peer network, and increasing latencies. Two methods, in particular, may be used to retire or archive older portions of the blockchain, leaving a shorter blockchain as the active portion, and reducing latency times. First, a section closing method may be used wherein an entire blockchain for a certain period (for example, the previous year, as in year-end closing in accounting) is reconciled, the balances of each account (e.g., wallet) are moved to a new, shorter blockchain, and the old blockchain is archived. Second, an asynchronous closing method may be used wherein the old blockchain is kept open, but archived. A new blockchain is created, but account balances are not automatically transferred. Whenever an activity involves an entry in the old blockchain, that particular entry is consolidated and closed out from the old blockchain, and is transferred to the new blockchain. In this manner, the old blockchain will gradually be fully consolidated and closed out.

In some embodiments, a multi-tiered blockchain database may be used to implement a cryptocurrency system. Such an implementation may include one or more demarcated sections, or areas, in which transactions are limited to those of a lesser denomination, with a limited number of ledger transacting nodes and a limited number of gateways interacting between the general area of unlimited currency and the demarcated area. Such areas may have a limited-time active ledger, and older transactions are moved to an archive to speed up new transactions. In such cases, old wallet entries are then transferred at the time of use to a new section of a new ledger. Also, in that demarcated area, mining could be restricted. Further, in this area, a central issuer, or bank, with a reserve, may stabilize the currency, and currency in this area may be traded at a fixed rate to another currency in the same area, which may be a real currency rather on a major cryptocurrency. Additionally, in such areas, so called mixer wallets may be blocked or confiscated to avoid misuse of funds for illegitimate purposes.

In some embodiments, the implementation will include a number of standardized smart contracts to provide baseline support of some key functionality including coupons, timed escrow (pay after N days), key-based escrow, and other related functions. Providing a set of standardized smart contracts will mitigate the problem of an exploding world of poorly-written smart contracts in the same way careful design and engineering is required to effectively use stored procedures in modern databases.

In some embodiments, support may be included for anonymous messaging in the block chain. Such messaging may used to send basic messages between both parties as well as instructions to smart contracts. Such messages would be limited to text fields only, so as to eliminate a potential security hole where links and code (such as JavaScript) could be incorporated in messages for nefarious purposes.

In some embodiments, the wallets established for holding, tracking, and transferring valuation associated with entries in a blockchain database may be restricted to holding or tracking only valuation associated with a certain tier or tiers, a certain functional area or areas, a certain geographic area or areas, or any combination of these restrictions. In other embodiments, there may be no such restriction, and wallets would be allowed to hold, track, or transfer to or from a plurality of tiers, functional areas, or geographical areas. In some embodiments, wallets will allow users to see the value of their stored coinage in their native coin value or normalized to the wallet's default currency based on current market prices for valuation.

In some embodiments, a system may have a multitude of nodes, each of which is capable of processing and managing a divided blockchain. Each node would be in constant communication with at least four more nodes with the same or similar capabilities, one of which claims to be the lead node of the blockchain. Also, each node could add transactions and confirm the lead's transactions on the current demarcation shard. In case of loss of connectivity to the lead node, one of the remaining nodes could immediately take over as new lead node based on a CDMA/CD type protocol and be recognized by vote as the new lead by all remaining nodes. IN some embodiments, a divided blockchain may be further divided into sub-divided blockchains. In some embodiments, after a certain blockchain sub-division size is reached, a new blockchain sub-division is started. Further, after a certain blockchain division (or shard) size is reached, a new blockchain division (or shard) is started. At a later time, older blockchain sub-divisions or divisions (or shards) could be consolidated according to rules into complete blocks and closed off upon consensus of the nodes.

FIG. 1 (PRIOR ART) is a diagram illustrating the operation of existing cryptocurrencies using blockchain technology 100. A sender 101 initiates a transaction request 102, which includes the sender's digital signature 103, a deposit of a digital asset 104 such as an amount of cryptocurrency, and the recipient's public encryption key 105. The transaction request 102 is placed into a peer-to-peer distributed computing network 106 associated with this cryptocurrency, where it is timestamped, bundled into a block with other transactions and a hash of all previous blocks in the chain, and broadcast to all nodes 107 in the network 106. Each node 107 that receives the block 108 subjects it to repeated encryptions until a hash is found that has a certain number of zeros at the beginning, which serves as a confirmation of validity. Once the required hash is found for the block 108, the hash is broadcast back to the network 106 for confirmation by other nodes 107 in the network 106. When a threshold number of confirmations are obtained, the block 108 is permanently added to the blockchain 109, which serves as an unchangeable ledger of transactions. The transaction is completed, and the recipient 110 now owns the digital asset 104 deposited with the transaction request 102.

The nodes 107 typically hold copies of the blockchain, which acts as the ledger of a blockchain transaction. Also, the sender 101 and recipient 110 have digital wallets (not shown) that store information about their accounts. The complete details of blockchain transactions are not shown here, but they are well known in the art. Examples of cybercurrency currently using such an approach are Bitcoin, which has the bitcoin as the principal unit of currency and the satoshi, equal to 0.00000001 bitcoin. Another cybercurrency is the Ether (ETH), one of which is currently (mid July 2017) valued at approximately one-twelfth of a Bitcoin (BTC) and has approximately one million subunits. The problem, as mentioned above, is that it can take roughly half an hour to get a sufficient number of ledgers in a blockchain to execute a simple wallet transaction. For example, when a user wants to send an amount from one wallet to another, he needs to point to the address where his wallet keeps the bitcoin that he has currently with his private pointer and take the amount in that location. He then points to the payee and indicates the amount that he wants to send to the payee, retaining the rest for himself as the payor. The amount in that wallet location is split in two, with one amount sent to the payee and the remainder sent back to the payor. Such is the transaction in the blockchain, which can be publicly inspected. When a sufficient number of nodes in the blockchain community have accepted this transaction, it is considered fulfilled and transacted. The problem is that most participants who make such transactions, often for a small amount of satoshi, use most of the capacity for mining new bitcoin, so that mining is becoming increasingly more expensive. As a result, with the growing size of the ledger, the time for this transaction, waiting in queue and then actually executing, grows exceedingly long, leaving the cybercurrency involved in the transaction vulnerable to currency fluctuations. Also, mixer service or mixer wallets are sometimes used to anonymize currency. Many approaches exist and are known in the art.

Figure 2:
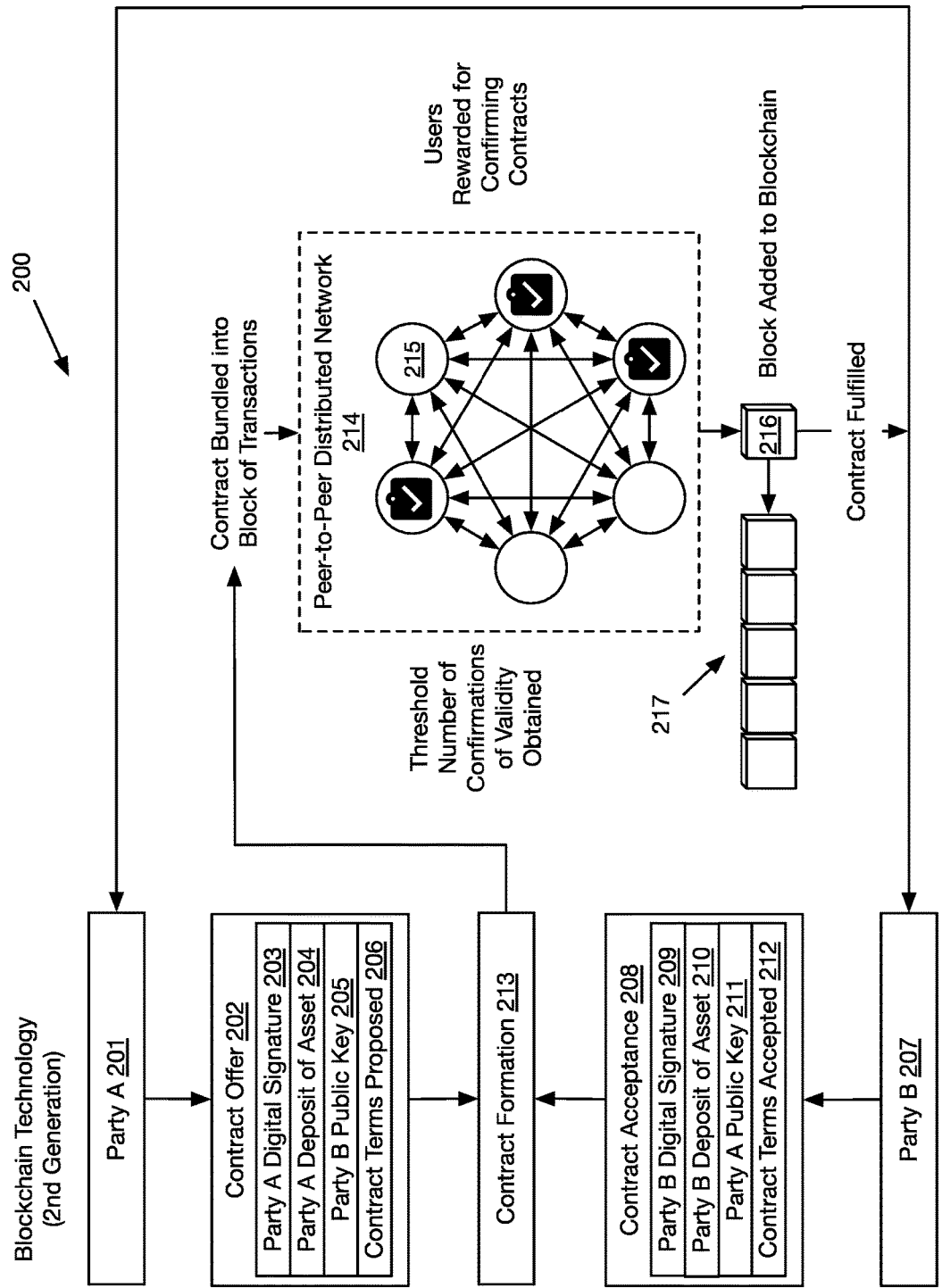
FIG. 2 (PRIOR ART) is a diagram illustrating the operation of existing cryptocurrencies with smart contract functionality using blockchain technology.

FIG. 2 (PRIOR ART) is a diagram illustrating the operation of existing cryptocurrencies with smart contract functionality using blockchain technology 200. In the case of cryptocurrencies with smart contract functionality, there is the added complexity of contract formation 213 in which at least two parties must participate. In effect, smart contracts act as a form of automated escrow without requiring a third party to act as the escrow holder. In this example, party A 201 puts together a contract offer 202, comprising party A's digital signature 203, party A's deposit of a digital asset 204, party B's 207 public encryption key 211, and the proposed terms of a contract 206. Party A's 201 contract offer 202 is received by party B 207, who may send a contract acceptance 208 comprising party B's 207 digital signature 209, party B's 207 deposit of a digital asset 210, party A's 201 public encryption key 205, and a confirmation of the contract terms accepted 212. Once the contract has been accepted, a contract is formed 213, and is placed into a peer-to-peer distributed computing network 214 associated with this cryptocurrency with smart contract functionality, where it is timestamped, bundled into a block 216 with other transactions and a hash of all previous blocks in the chain, and broadcast to all nodes 215 in the network 214. Each node 215 that receives the block 216 subjects it to repeated encryptions until a hash is found that has a certain number of zeros at the beginning, which serves as a confirmation of validity. Once the required hash is found for the block 216, the hash is broadcast back to the network 214 for confirmation by other nodes 215 in the network 214. When a threshold number of confirmations are obtained, the block 216 is permanently added to the blockchain 217, which serves as an unchangeable ledger of transactions. The smart contract is completed, and party A 201 now owns the digital asset deposited by party B 207, and vice-versa. While it is not shown in this diagram, it is possible to include external triggers in the contract terms proposed 213 (for example, the type of weather on a certain day as shown on a particular website), and the contract execution or cancelation will be delayed until that trigger is received by the network 214.

Various embodiments of the present disclosure may be implemented in computer hardware, firmware, software, and/or combinations thereof. Methods of the present disclosure can be implemented via a computer program instructions stored on one or more non-transitory computer-readable storage devices for execution by a processor. Likewise, various processes (or portions thereof) of the present disclosure can be performed by a processor executing computer program instructions. Embodiments of the present disclosure may be implemented via one or more computer programs that are executable on a computer system including at least one processor coupled to receive data and instructions from, and to transmit data and instructions to, a data storage system, at least one input device, and at least one output device. Each computer program can be implemented in any suitable manner, including via a high-level procedural or object-oriented programming language and/or via assembly or machine language. Systems of the present disclosure may include, by way of example, both general and special purpose microprocessors which may retrieve instructions and data to and from various types of volatile and/or non-volatile memory. Computer systems operating in conjunction with the embodiments of the present disclosure may include one or more mass storage devices for storing data files, which may include: magnetic disks, such as internal hard disks and removable disks; magneto-optical disks; and optical disks. Storage devices suitable for tangibly embodying computer program instructions and data (also called the "non-transitory computer-readable storage media") include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Changes and modifications may be made to the disclosed embodiments without departing from the scope of the present disclosure. These and other changes or modifications are intended to be included within the scope of the present disclosure, as expressed in the following claims.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 3:
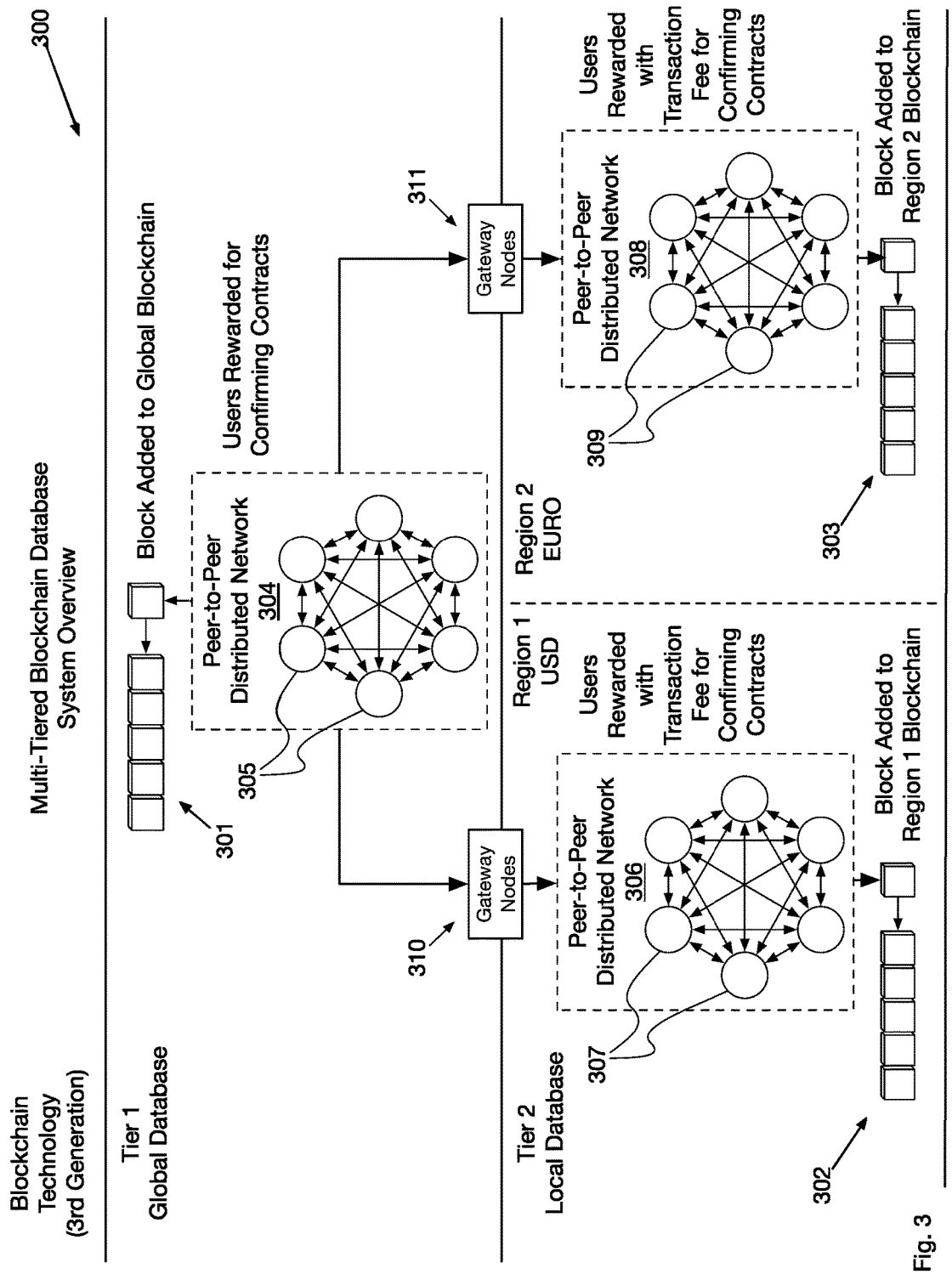
FIG. 3 is a diagram showing an exemplary system overview of a multi-tiered blockchain database.

FIG. 3 is a diagram showing an exemplary system overview 300 of a multi-tiered blockchain database. In some embodiments, the blockchain database maintained for the global database 301, and for each lower tier database 302, 303 would comprise tiers of a single blockchain, but in other embodiments, they would comprise separate blockchains. In certain embodiments, the peer-to-peer networks for the global database 304 and for each lower tier region 306, 308 might be required to be separate and distinct (i.e., share no nodes 305, 307, 309), but in other embodiments might be allowed to share nodes 305, 307, 309. In some embodiments, there may exist gateway nodes 310, 311 between the global database 301 and each lower tier regional database 302, 303 to enforce separation of transactions in each region of each tier.

Figure 4:
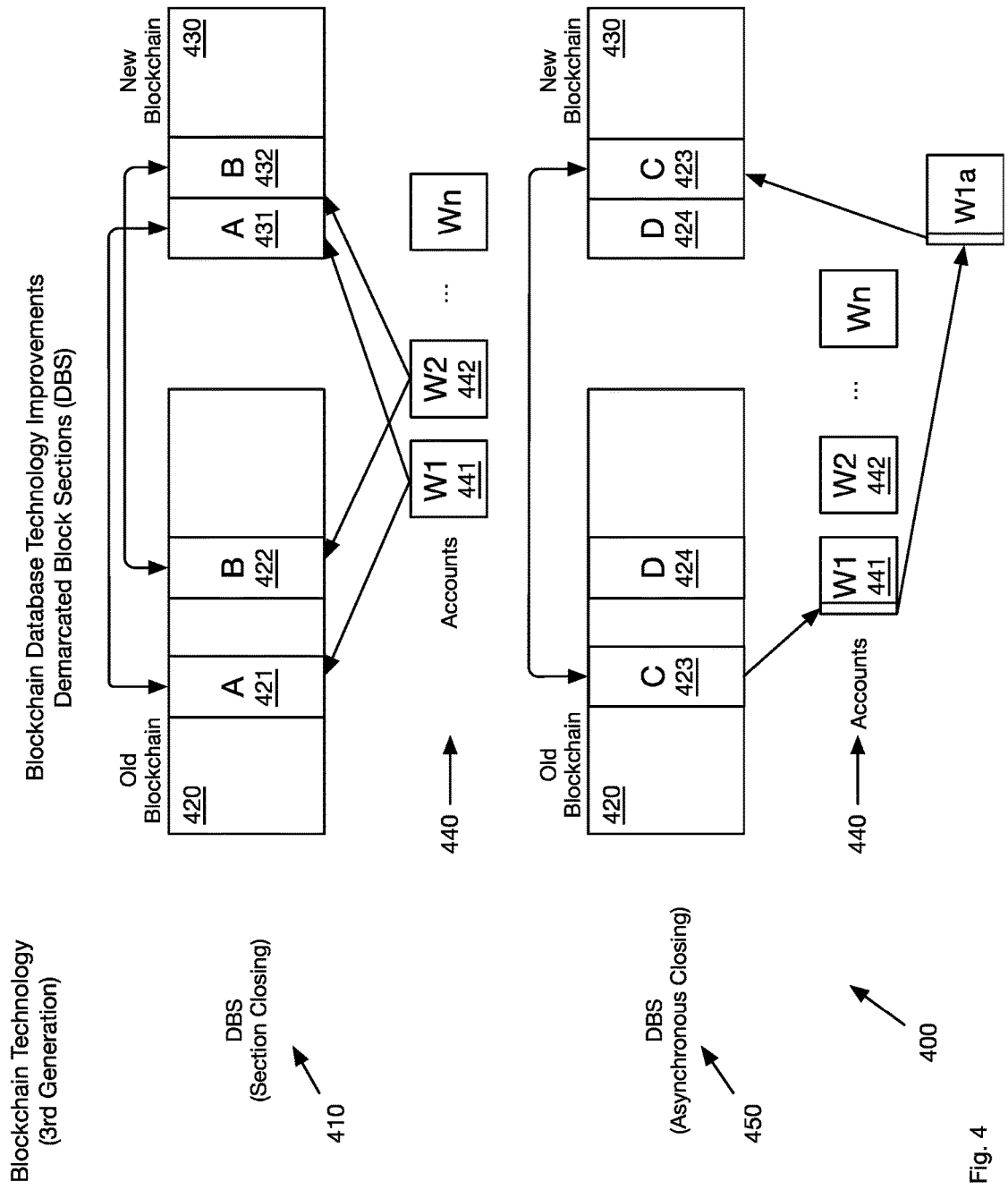
FIG. 4 is a diagram showing an exemplary technical improvement to blockchain databases: demarcated block sections.

FIG. 4 is a diagram showing an exemplary method for improvement to blockchain databases: demarcated block sections 400, in which account reconciliation may be used to retire or archive older portions of the blockchain, leaving a shorter blockchain as the active portion, and reducing latency times. In the section closing method 410 the old blockchain 420 is reconciled all at once, and the balances of each account 440 are moved to a new, shorter blockchain 430, and the old blockchain 420 is archived. For example, when the old blockchain 420 is reconciled, account balance A 421 associated with account W1 441 and account balance B 422 associated with account W2 442 are moved to the new blockchain 430 simultaneously as account balance A 431 and account balance B 432, and the old blockchain 420 is archived. In the asynchronous closing method 450, the old blockchain 420 is kept open, but archived. A new blockchain 430 is created, but account balances are not automatically transferred. Whenever an activity involves an entry in the old blockchain 420, that entry is consolidated and closed out, and is transferred to the new blockchain 430. For example, entry D 424 has already been accessed, closed out, and transferred to the new blockchain 430. When entry C 423 associated with account W1 441 is accessed in the old blockchain 420, it will be closed out and transferred to the new blockchain 430. In this manner, the old blockchain 420 will gradually be fully consolidated and closed out.

Figure 5:
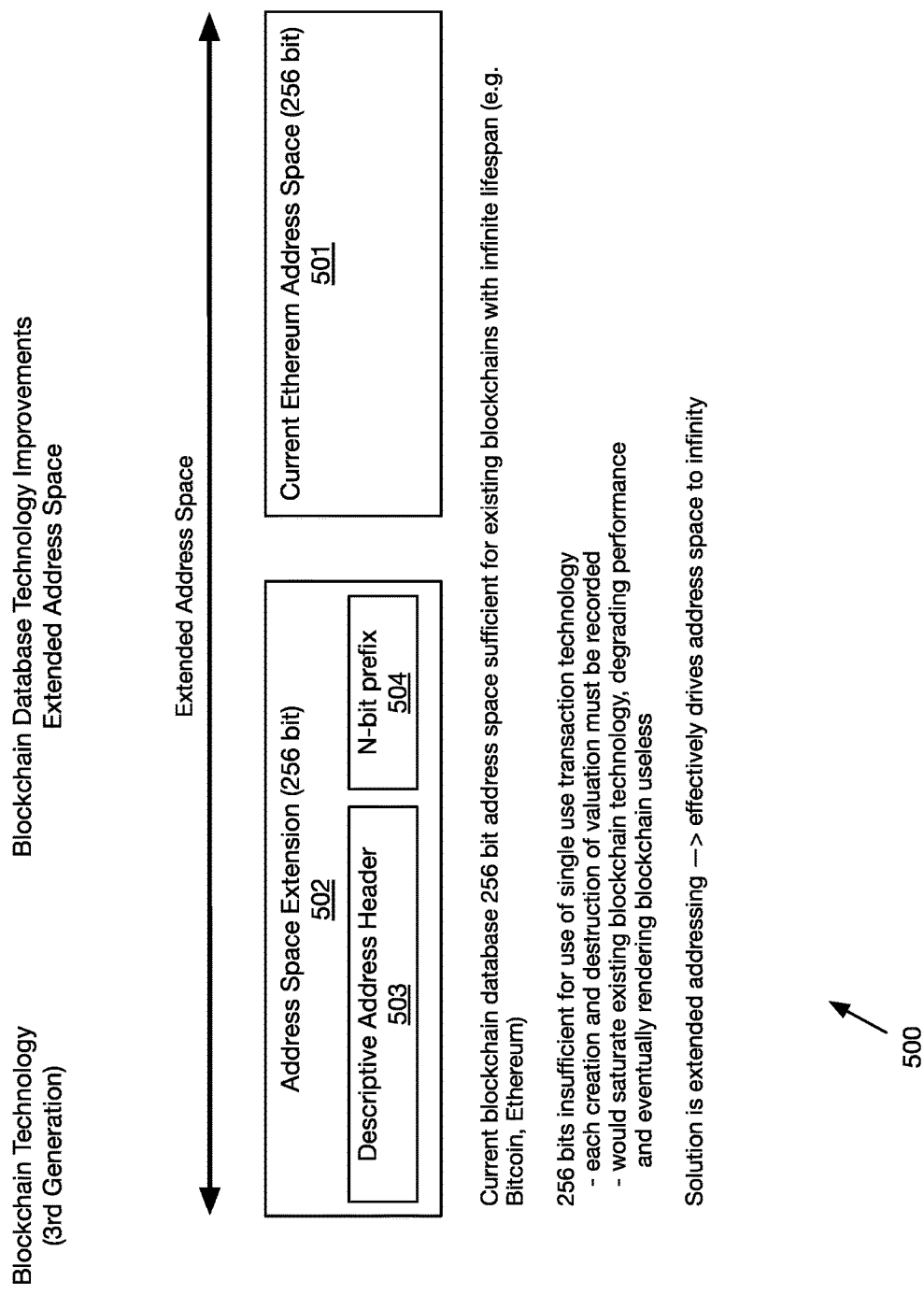
FIG. 5 is a diagram showing an exemplary technical improvement to blockchain databases: extended address space.

FIG. 5 is a diagram showing an exemplary technical improvement to blockchain databases: extended address space 500. Current blockchains use a 256 bit address space 501. While this is sufficient for existing blockchains with infinite token lifespan (e.g. Bitcoin, Ethereum), 256 bits insufficient for use of single use token technology where the creation and destruction of each coin must be recorded. This would saturate the existing 256-bit address space, degrading performance and eventually rendering the blockchain and cryptocurrency useless. The solution is to use an address space extension 502, comprised of a descriptive address header 503, and an n-bit prefix 504, which effectively provides unlimited address space.

Figure 6:
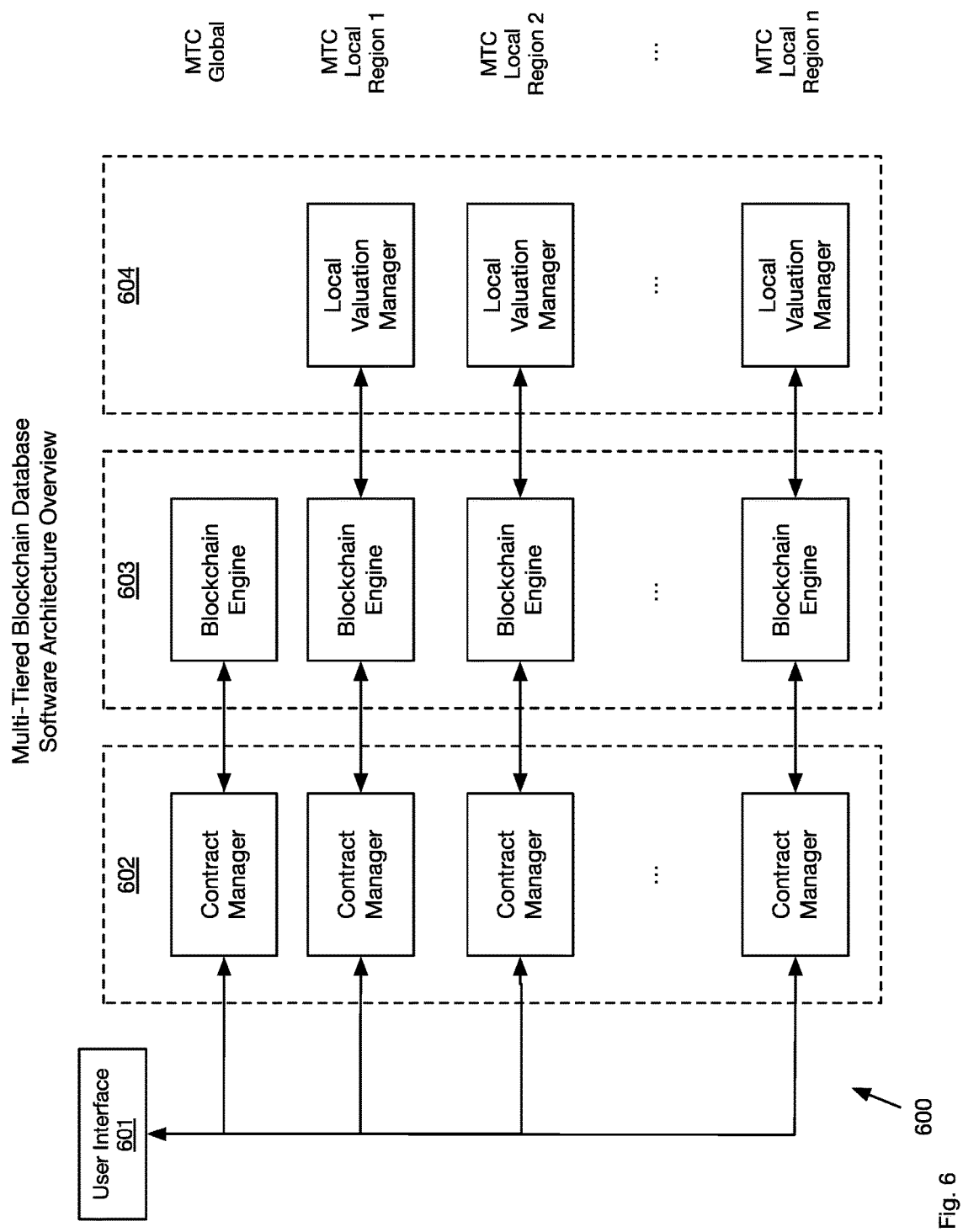
FIG. 6 is a block diagram showing an exemplary software architecture overview for a multi-tiered blockchain database.

FIG. 6 is a block diagram showing an exemplary software architecture overview 600 for a multi-tiered blockchain database. The basic system would comprise a plurality of user interfaces 601 through which users could manage their accounts, a series of contract managers 602, one for the global database, and one for each lower tier database, a series of blockchain engines 603, one for each database, and a series of local valuation managers 604 at the lower tiers only, which serve to fix the exchange rate of tokens within each region within the lower tier databases relative to another valuation in that region.

Figure 7:
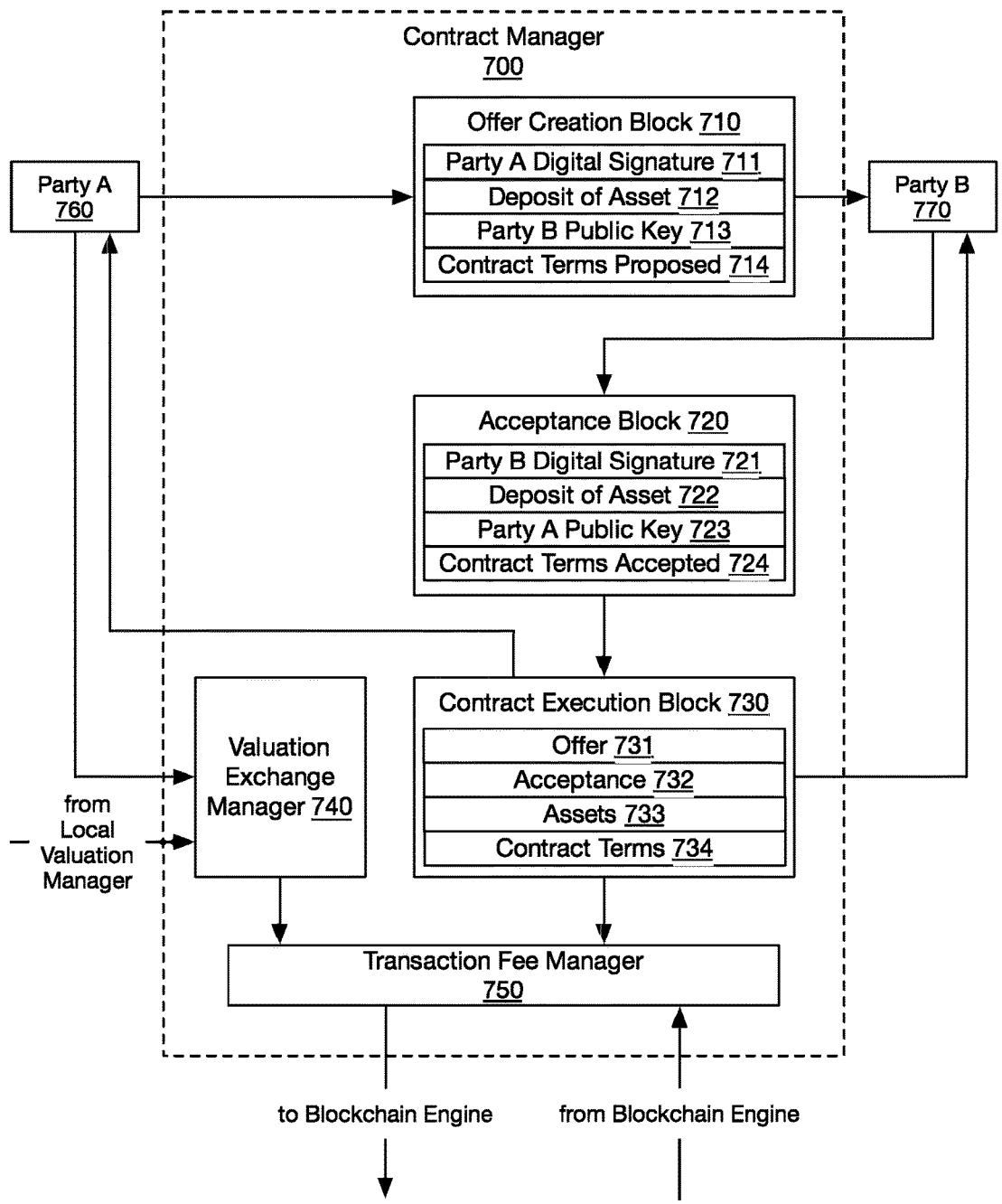
FIG. 7 is a block diagram showing an aspect of an exemplary software architecture for a multi-tiered blockchain database, a contract manager.

FIG. 7 is a block diagram showing an aspect of an exemplary software architecture for a multi-tiered blockchain database, a contract manager 700. At the request of party A 760, the contract manager 700 is responsible for the creation of offers in the offer creation block 710 comprising party A's digital signature 711, party A's deposit of a digital asset 712, party B's 770 public encryption key 713, and the proposed terms of a contract 714. Party A's 760 contract offer 710 is received by party B 770, who may send a contract acceptance to the contract acceptance block 720 comprising party B's 770 digital signature 721, party B's 770 deposit of a digital asset 722, party A's 760 public encryption key 723, and a confirmation of the contract terms accepted 724. Once the offer has been accepted, a contract is formed by the contract execution block 730, comprising the offer 731, the acceptance 732, the assets 733, and the contract terms 734. The contract is sent to a transaction fee manager 750, which extracts the appropriate fee for the transaction, and forwards the contract to the blockchain engine (see FIG. 11) for processing. When the conditions of the contract are met, and confirmed by the blockchain engine (see FIG. 11), the contract is executed by the contract execution block 730, and the deposited assets 712, 722 are transferred to the appropriate party. In some embodiments, there may exist a valuation exchange manager 740 through which assets may be exchanged by a party 760 and through which a local valuation manager (not shown) may tie the value of tokens to a different valuation in that region.

Figure 8:
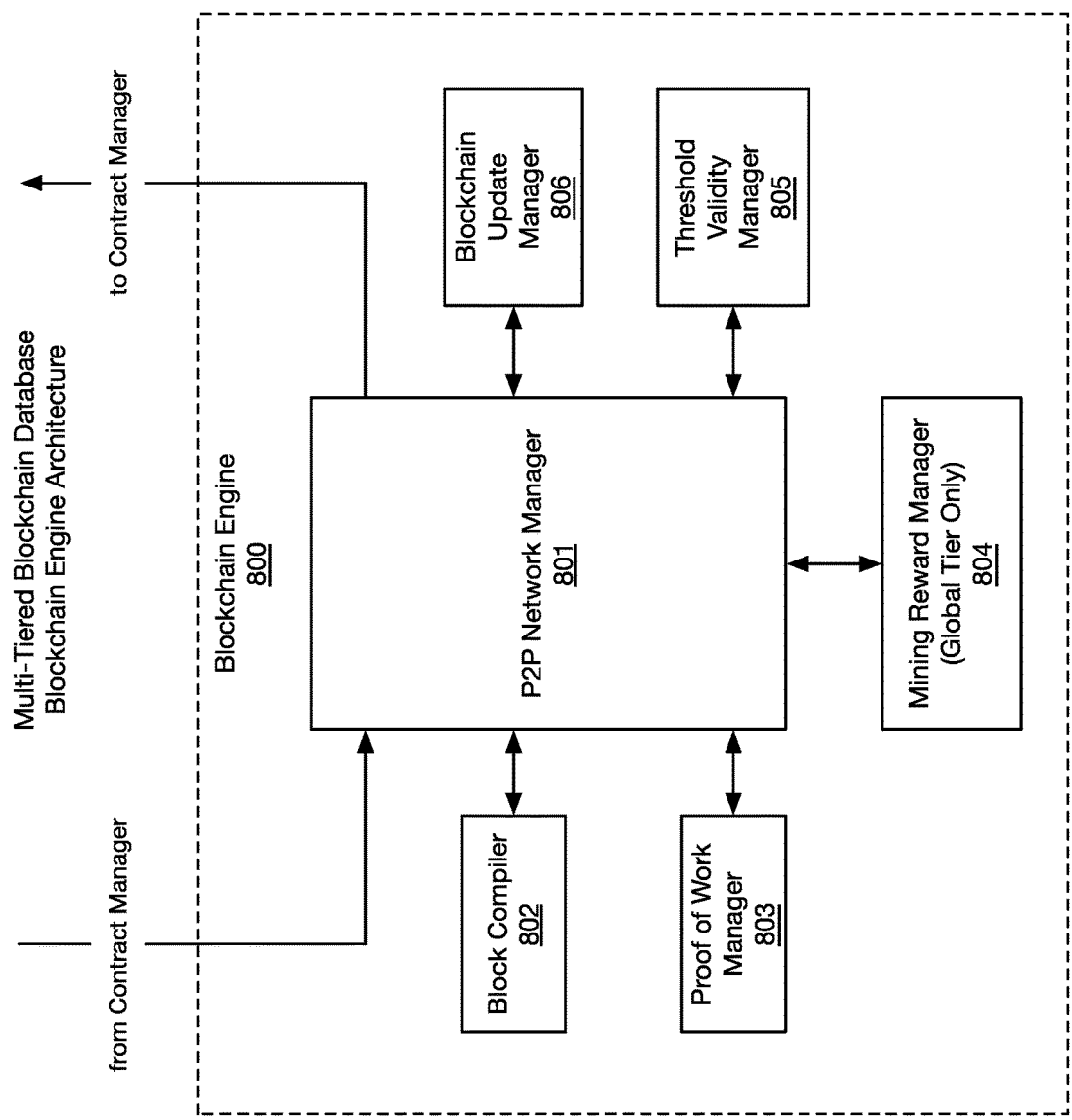
FIG. 8 is a block diagram showing an aspect of an exemplary software architecture for a multi-tiered blockchain database, a blockchain engine.

FIG. 8 is a block diagram showing an aspect of an exemplary software architecture for a multi-tiered blockchain database, a blockchain engine 800. As contracts are received from the contract manager 1000, they are placed into a peer-to-peer network manager 801, which manages the process of creating blocks, validating them, and adding them to the blockchain. The peer-to-peer network manager comprises a block compiler 802, which compiles the contracts into blocks for validation, a proof of work manager 803, which broadcasts the block to nodes in the network for validation, a mining reward manager 804, which issues rewards to nodes that successfully validate the block (only if mining is allowed at that tier), a threshold validity manager 805, which tallies the number of confirmations received, and a blockchain update manager 806, which updates the blockchain when the threshold number of validations has been obtained.

Figure 9:
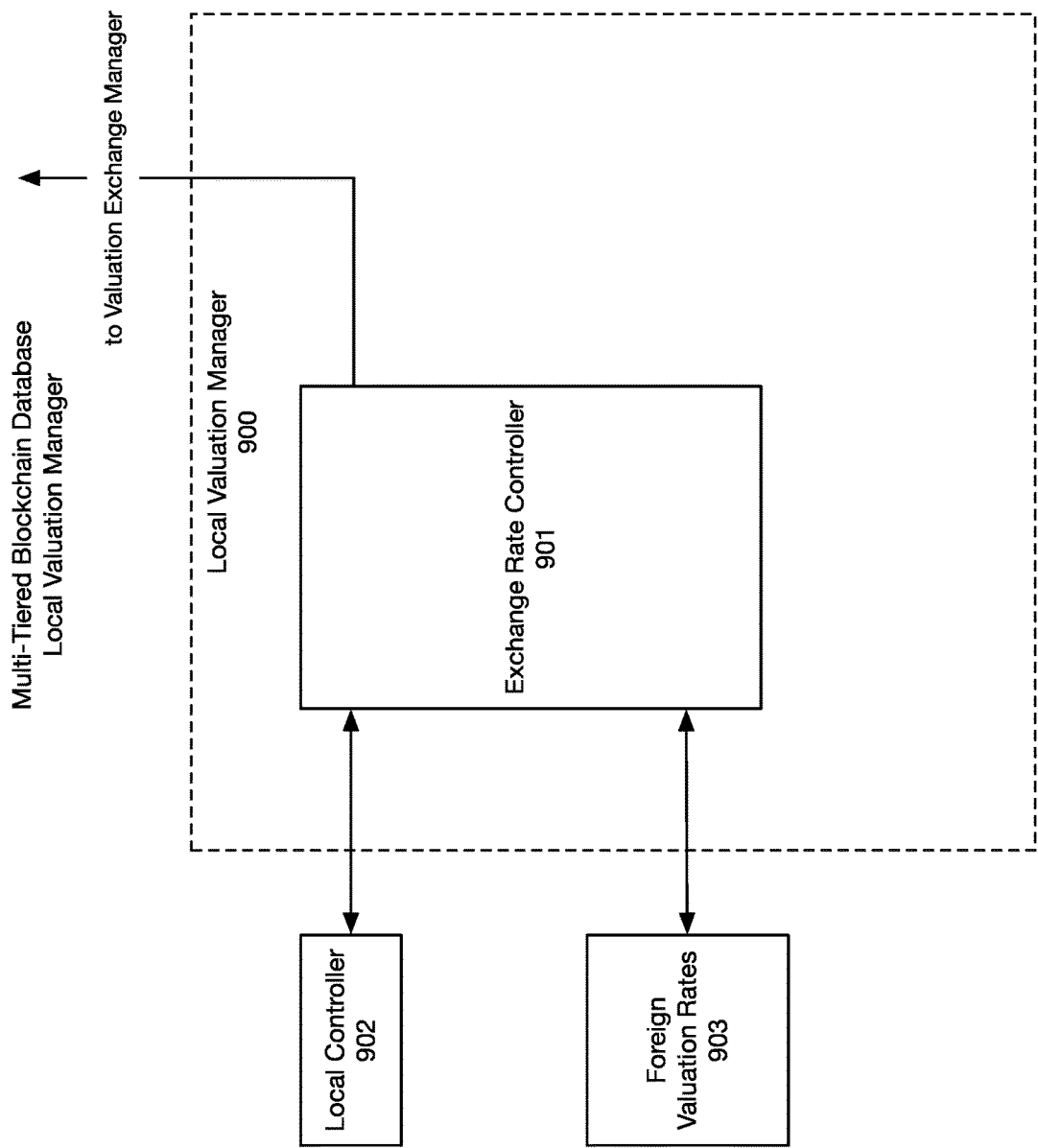
FIG. 9 is a block diagram showing an aspect of an exemplary software architecture for a multi-tiered blockchain database, a local currency manager.

FIG. 9 is a block diagram showing an aspect of an exemplary software architecture for a multi-tiered blockchain database, a local valuation manager 900. The local valuation manager 900 comprises an exchange rate controller 901, which may be accessed by local controller 902 to tie the value of tokens to a different valuation, and which may be fed foreign valuation rates 903, to keep the exchange rate current.

Figure 10:
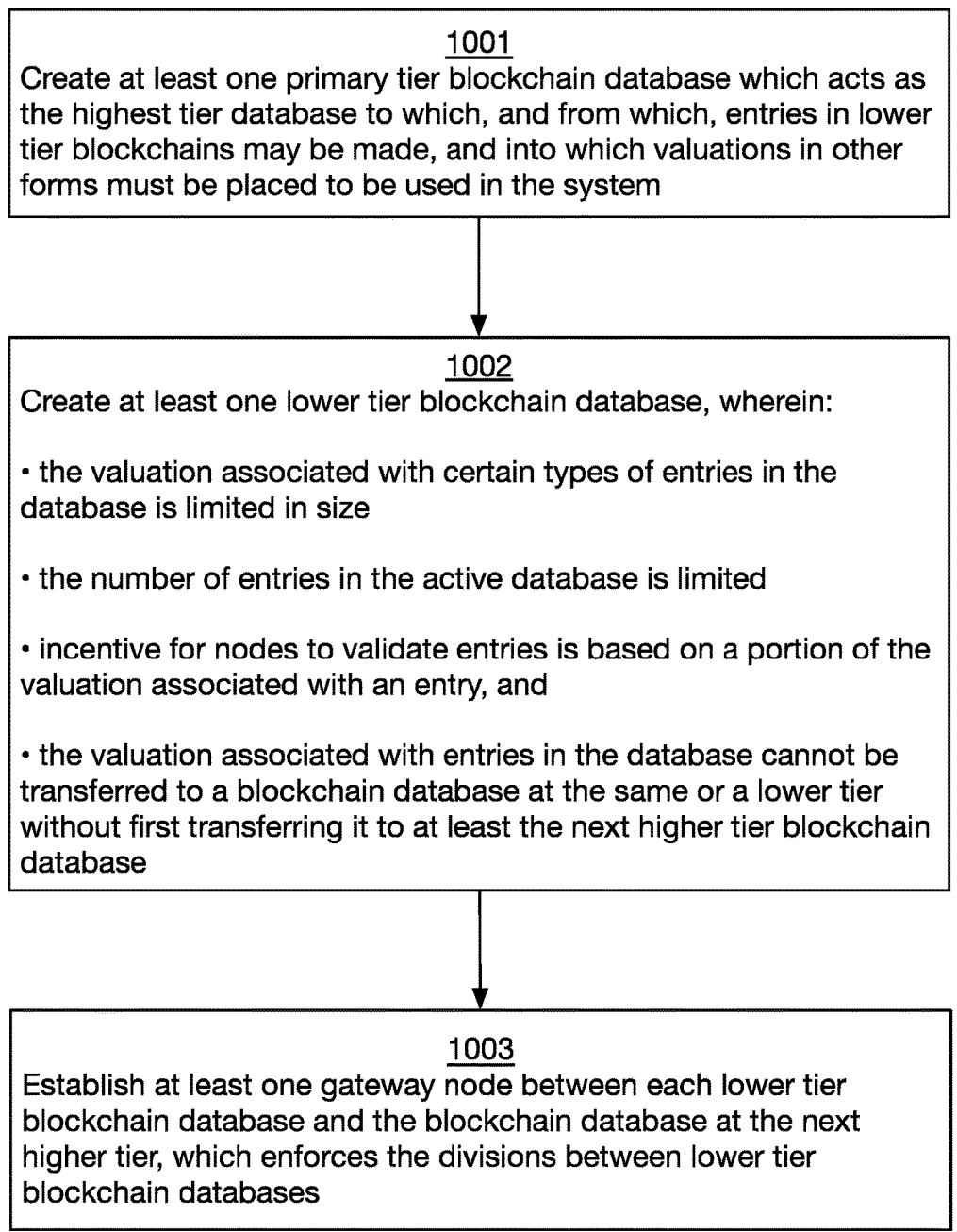
FIG. 10 is a diagram showing an exemplary method for a multi-tiered blockchain database system.

FIG. 10 is a diagram showing an exemplary method for a multi-tiered blockchain database system 1000, comprising the steps of: 1001 creating at least one primary tier blockchain database wherein the primary tier blockchain database represents a cryptocurrency, the primary tier blockchain database acts as the highest tier database, and into which valuations in other forms must be placed to be used in the system, and the primary tier blockchain database acts as the highest tier database to which, and from which, entries in lower tier blockchains may be made; and 1002 creating at least one lower tier blockchain database, wherein: the lower tier blockchain database represents a cryptocurrency either having the same valuation as the valuation of the cryptocurrecy at the primar tier, or having a different valuation, the valuation associated with certain types of entries in the database is limited in size, the number of entries in the active database is limited, incentive for nodes to validate entries is based on a portion of the valuation associated with an entry or based on a transaction fee; and 1003 establishing at least one gateway node between each lower tier blockchain database and the blockchain database at the next higher tier, which enforces the divisions between lower tier blockchain databases.

Figure 11:
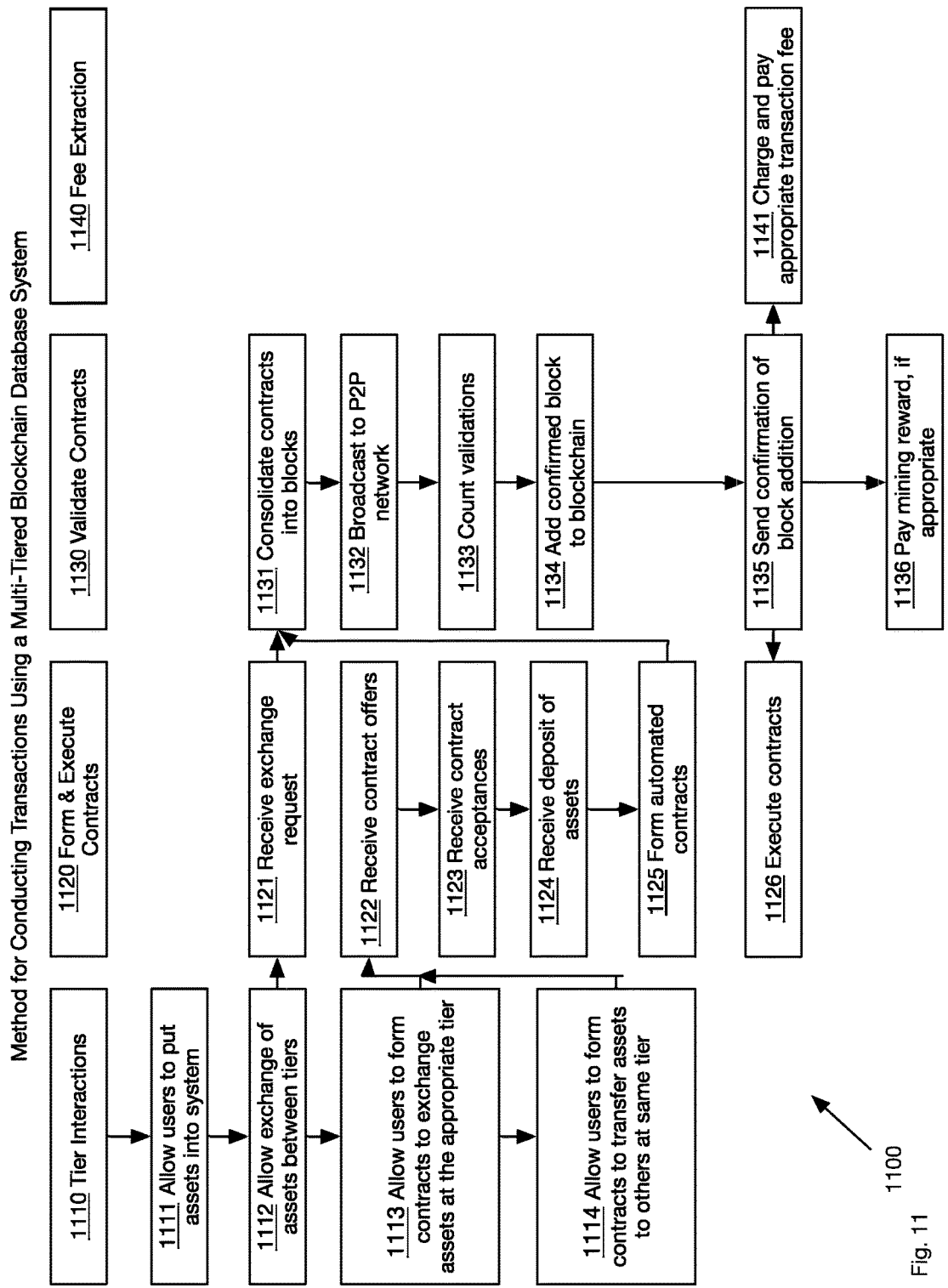
FIG. 11 is a flow diagram showing an exemplary method for conducting transactions using a multi-tiered blockchain database.

FIG. 11 is a flow diagram showing an exemplary method 1100 for conducting transactions using a multi-tiered blockchain database, comprising four functional areas: tier interactions 1110, forming and execution of contracts 1120, validating contracts 1130, and fee extraction 1140. The tier interaction area comprises the steps of: allowing users to put assets into the system 1111, allowing users to exchange assets between tiers 1112, allowing users to form contracts to exchange assets at the appropriate tier 1113, and allowing users to form contracts to transfer assets to others at the same tier 1114. The formation and execution of contracts functional area comprises the steps of: receiving exchange requests 1121, receiving contract offers 1122, receiving contract acceptances 1123, receiving deposits of assets 1124, forming automated contracts 1125, and executing those contracts 1126. The validation of contracts functional areas comprises the steps of: consolidating contracts into blocks 1131, broadcasting the blocks to a peer-to-peer network 1132, counting validations 1133, adding confirmed blocks to the blockchain 1134, sending confirmation of block additions 1135, and paying of the mining reward 1136, if any. The fee extraction functional area comprises the steps of: charging and paying the appropriate transaction fee 1141.

Figure 15:
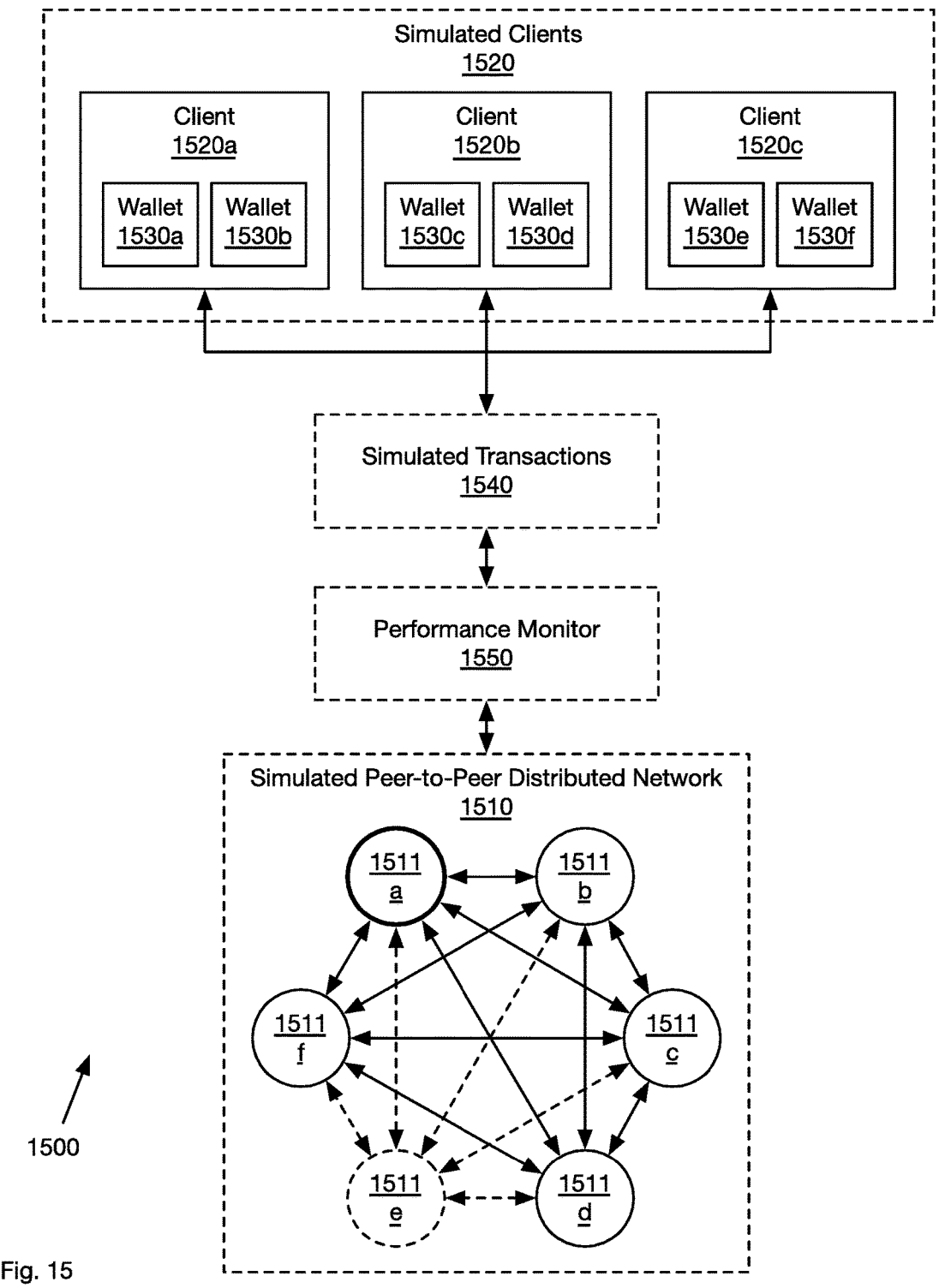
FIG. 15 shows an overview of an exemplary embodiment of a high-performance scalability test system.

FIG. 15 shows an overview of an exemplary embodiment of a high-performance scalability test system 1500. On a computer network, for example a networked cloud server system such as a private Ethereum-based network in the Amazon Web Server (AWS) cloud, a simulated peer-to-peer distributed network 1510 is created comprising a small set of nodes 1511a-f which are instantiated for the purpose of running a simulation of activity on an implementation of at least one shard of a divided blockchain. A plurality of simulated clients 1520, 1520a-c, simulated wallets 1530a-f, and simulated transactions 1540 are generated or loaded from pre-generated data. The system the runs a simulation using the simulated peer-to-peer distributed network 1510 using the simulated clients 1520, 1520a-c, wallets 1530a-f, and transactions 1540. The performance monitor 1550 and records various system performance metrics such as transactions per second (TPS), lag time between transactions, number of lost connections with nodes, failed transactions, failed block creation, system hangs, and other performance characteristics. In this example, the system is set up to process a single shard of a divided blockchain using a small set of nodes, with the lead node 1511a having been designated as indicated by the bold outline, and one node 1511e having lost connection with the network, as indicated by the dashed lines. In the case where the lead node 1511a loses its connection to the network, a new lead node 1511a will be appointed by consensus of the remaining nodes 1511b-f. If a non-lead node 1511b-f is taken off line by a user, or connections are shut off, clients 1520a-c on that node are moved to other nodes 1511a-f to keep the system load the same. In some embodiments, after a certain blockchain sub-division size is reached, a new blockchain sub-division is started. Likewise, after a certain blockchain division (or shard) size is reached, a new blockchain division (or shard) is started. At a later time, older blockchain sub-division or blockchain divisions (or shards) could be consolidated according to rules into complete blocks and closed off upon consensus of the nodes 1511a-f.

Figure 16:
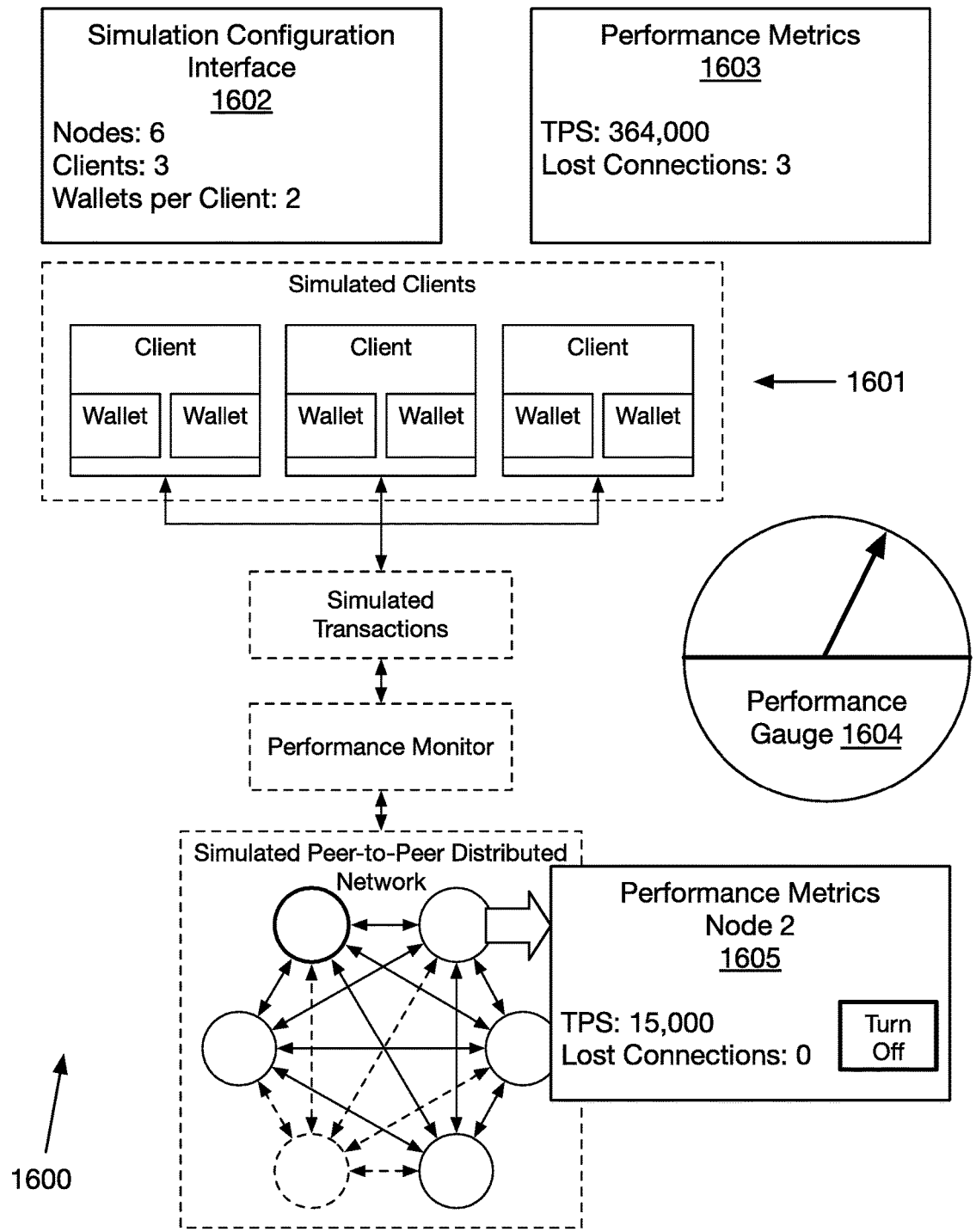
FIG. 16 shows an exemplary computer screen layout for operation of the testing system.

FIG. 16 shows an exemplary computer screen layout 1600 for operation of the testing system. The test network 1601 is set up using the simulation configuration interface 1602 in which the number of nodes 1511a-f, the number of clients 1520a-c, and number of wallets 1530a-f per client may be specified. The resulting test network 1601 may be displayed, showing the configuration of the simulation. In certain embodiments, the inputs for the number of nodes 1511a-f, the number of clients 1520a-c, and number of wallets 1530a-f per client may be specified may be limited to certain values depending on the stage of testing, but in other embodiments, they may be unlimited. For example, in early stage testing, the number of nodes might be restricted to fewer than 10, whereas in later stages, the number can be increased to test the blockchain implantation for larger system configurations. Each client 1520a-c adds a certain demand on the network, resulting in a system total transaction throughput that may be measured by at least one performance metric, which is displayed in a performance metrics 1603 display. Optionally, a performance gauge 1604 may be added to provide a graphical display of system performance for a single metric or any combination of performance metrics. Users can mouse over, or point to, any location on the test network 1601 to see a pop-up window 1605 with details, and providing options for interacting with or changing the settings of that particular component, such as turning a node on or off. Optionally, while looking at details of a test network component, a user can double-click to open additional windows (not shown) for additional detail. The same interface approach may be applied to any component of the test network, including but not limited to clients 1520a-c links between and among nodes 1511a-f, wallets 1530a-f, and the simulated transactions 1540.

Figure 17:
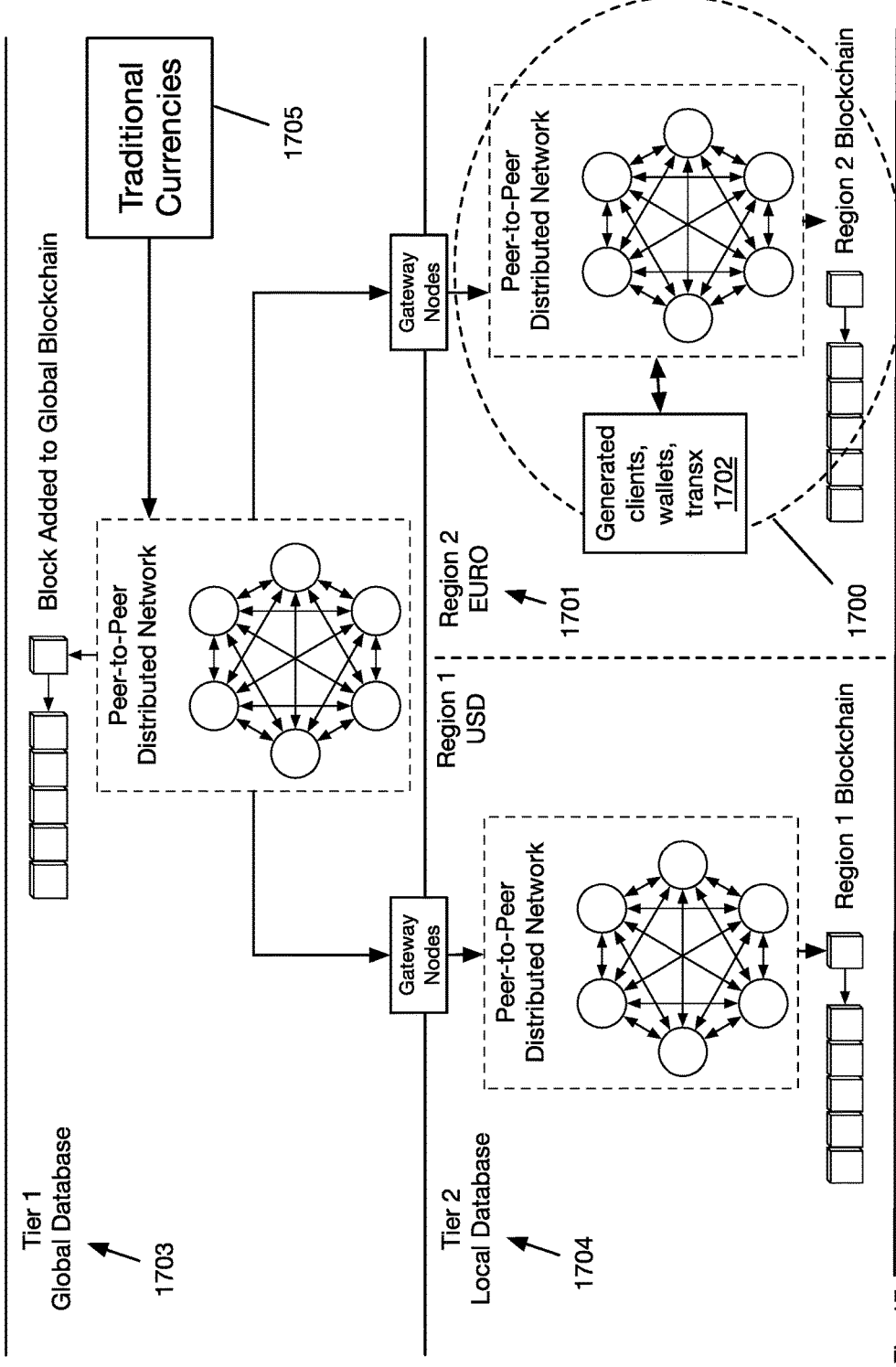
FIG. 17 shows an exemplary testing system limited to a particular region, according to one aspect of the system and method disclosed herein.

FIG. 17 shows an exemplary testing system 1700 limited to a particular region, according to one aspect of the system and method disclosed herein. System 1700, in this case, encompasses a single local token area 1701, using, in this example, Euro tokens. Further, system 1700 is based on pre-generated datasets 1702 in the form of simulated clients 1520, 1520a-c, simulated wallets 1530a-f, and simulated transactions 1540. In this example, six nodes 1511a-f have been instantiated in a private Ethereum-based network in the AWS cloud. Pre-generated and re-usable datasets could comprise 10,000 accounts (wallets), where each wallet holds a random number of tokens between 10 and 1000. In this example, the proof of scope concept border 1700 is limited to that area, and would not include tokens from the global tier 1703, tokens from other lower tier regions such as USD tokens 1704 or other instrument tokens such as those coming from traditional currencies 1705.

Figure 18:
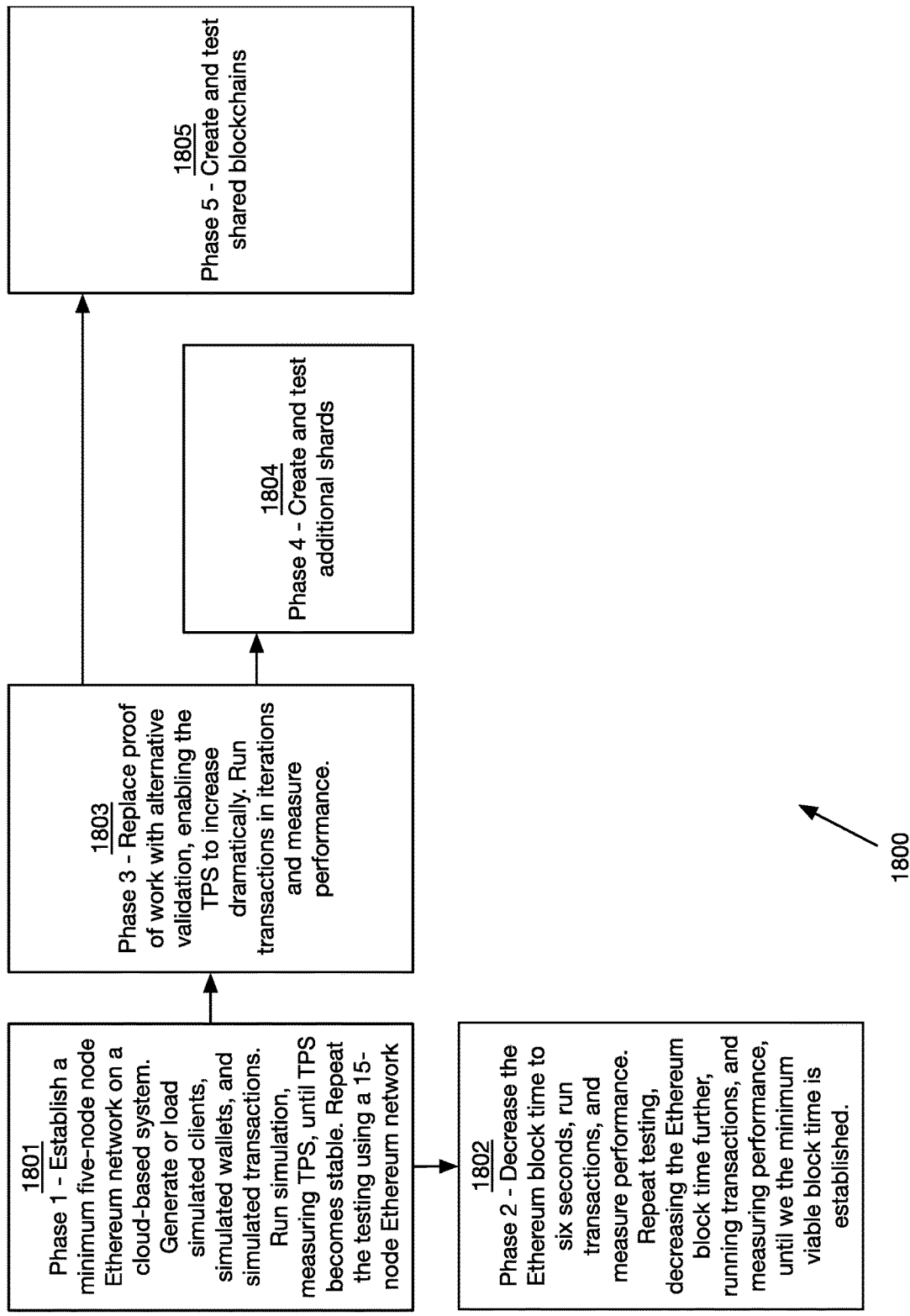
FIG. 18 shows exemplary testing phases (stages) for testing of a divided blockchain database.

FIG. 18 shows exemplary testing phases 1800 (stages) for testing of a divided blockchain database. In the implementation phases, the goal for each phase is to measure performance. Performance may be defined as N transactions/seconds (TPS), with the TPS stable after M seconds. In phase one 1801 of building such a system, a minimum five-node Ethereum network is established on AWS. Then datasets are pre-generated in a database, such as, for example, Mongo database. Programs to generate accounts and wallets with tokens in Ethereum and to pre-load transactions in Ethereum queues without executing them are created. Transactions in out-of-box Ethereum are executed, and performance is measured. The test run may be stopped after the TPS becomes stable. Then the test run and measurements are repeated using a 15-node Ethereum network. In phase two 1802, the system would decrease the Ethereum block time to six seconds, run transactions, and measure performance. Testing would be repeated, decreasing the Ethereum block time further, running transactions, and measuring performance, until we the minimum viable block time is established. In most cases, it is expected that Phase 1 and 2 should be completed in 2 weeks from start of testing. Phase three 1803 runs in parallel to phases one and two. In phase three 1803, the proof of work validation is replaced with alternative validation and trust measures such as proof of stake, that are simpler and faster, enabling the TPS to increase dramatically. Transactions are run in iterations, and performance is measured. Phase four 1804 requires additional implementation of demarcated blockchains. Again, this phase runs in parallel to phases one and two. Transactions are run in iterations, and performance is measured. Phase five 1805 comprises establishment of shared blockchains. Again, this phase runs in parallel to phases one, two, and three. Transactions are run in iterations, and performance is measured.

Detailed Description of Exemplary Aspects

Figure 12:
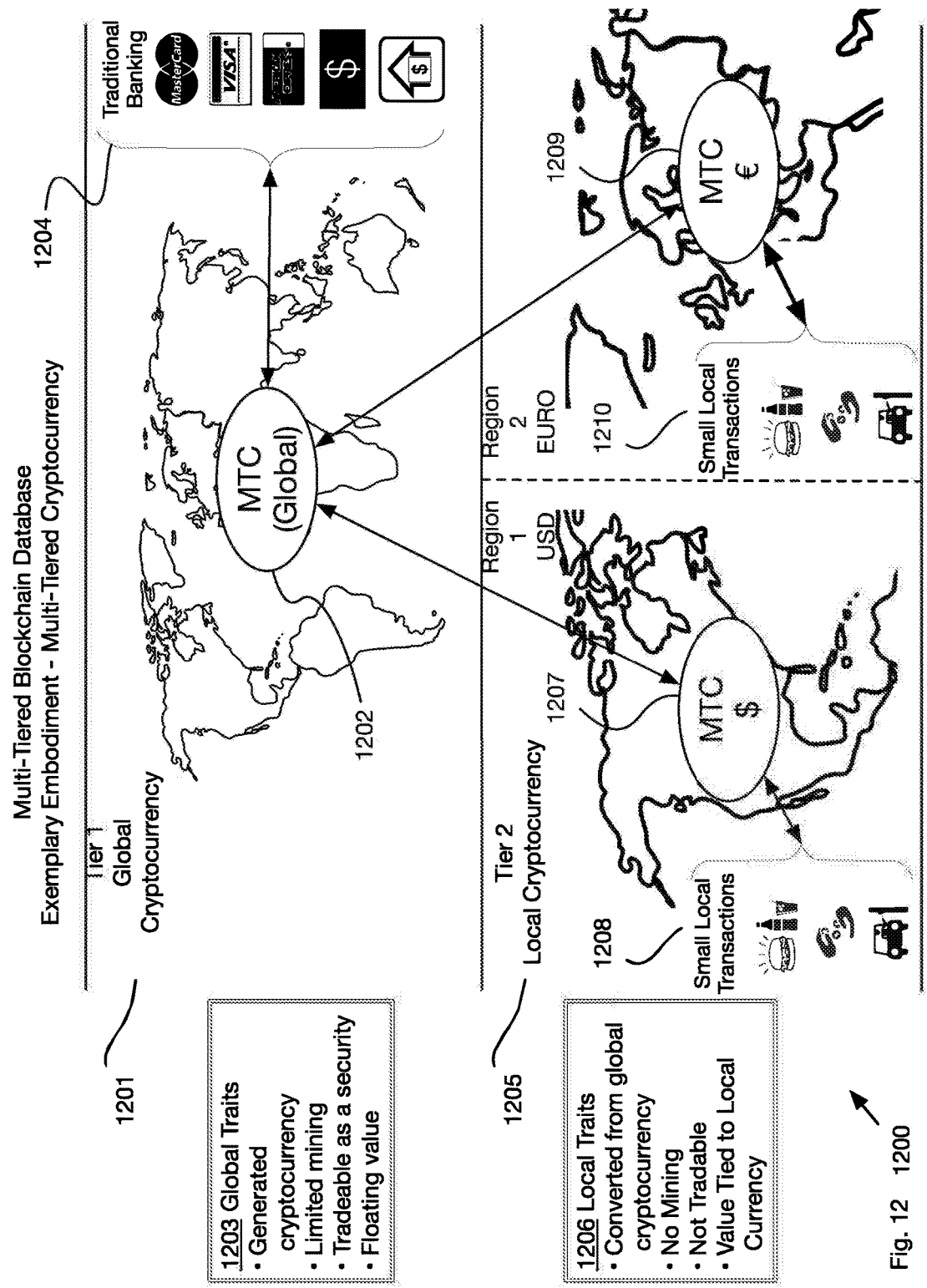
FIG. 12 is a diagram showing an exemplary conceptual framework for a multi-tiered cryptocurrency.

FIG. 12 is a diagram showing an exemplary conceptual framework for a multi-tiered cryptocurrency 1200. Tier 1 1201 of the multi-tiered cryptocurrency would consist of a global cryptocurrency 1202 with traits similar to existing cryptocurrencies 1203 such as having currency generated over time, allowing mining, allowing the cryptocurrency to be traded as a security, and having a floating value. Other currencies could be exchanged for the global cryptocurrency through traditional banking means 1204. Tier 2 1205 would likely be regional or national in scope. The cryptocurrency at this tier would be converted from the global cryptocurrency 1202, and would have traits different from existing cryptocurrencies 1206 that facilitate small value transactions, such as no mining ability, not tradeable as securities, and value tied to a local real currency. In one embodiment, one Tier 2 1205 cryptocurrency could be restricted to use in the United States with the value tied to value the USD 1207 with transactions limited in value and optimized for small local transactions such as fast food or gas purchases 1208, while another Tier 2 1205 tier cryptocurrency could be restricted to use in Europe with the value tied to the Euro 1209, with transactions limited in value and optimized for small local transactions such as fast food or gas purchases 1210. For clarity and simplicity, only two exemplary regions are shown, but there could well exist many more.

Figure 13:
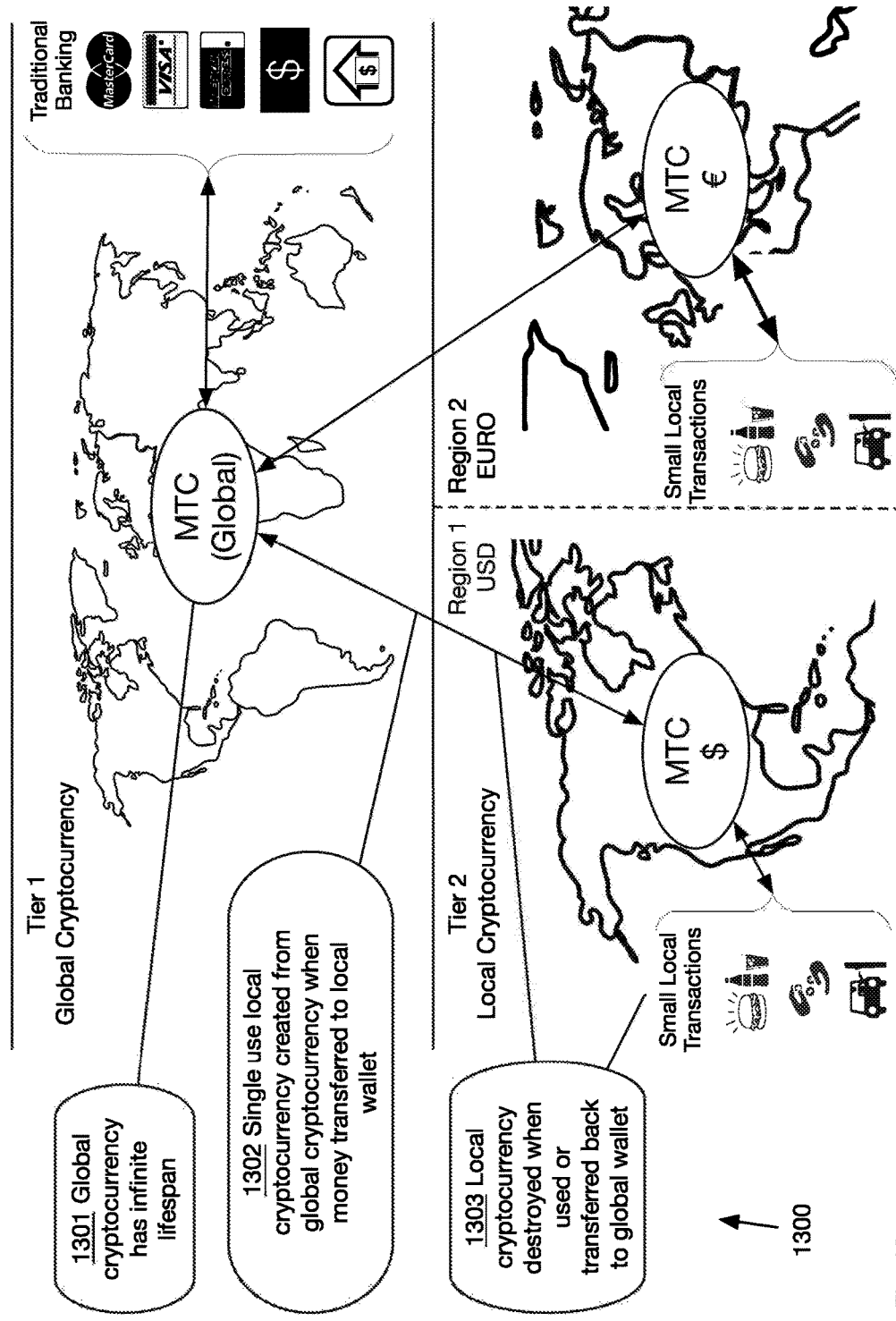
FIG. 13 is a diagram showing an exemplary technical improvement to blockchain technology for use with cryptocurrencies: single use tokens.

FIG. 13 is a diagram showing an exemplary method for improvement of blockchain technology for use with cryptocurrencies through the use of single use tokens 1300. In this method, there would exist a primary tier cryptocurrency 1301 which, when converted to lower tier currencies would be created as single use cryptocurrency 1302 and, when used or converted back to the primary tier cryptocurrency, would be destroyed 1303. Single-use tokens in a lower tier enables the control and tracking of currency in a public blockchain with no storage of value. These single use tokens are created then destroyed after redemption, unlike classic cryptocurrency where coins have an infinite lifespan. They are also used for other one-time transactions or other applications where value is held on a one-time basis or time-limited. For example, a company may provide "expiring cash offers", where a specific amount of currency is credited to a specific individual but expires at a specific time or because of a specific event. No equivalent of this function exists within current cryptocurrency solutions. Destruction of these coins via Smart Contracts and directly via the blockchain yields significantly enhanced security to this cryptocurrency solution.

Figure 14:
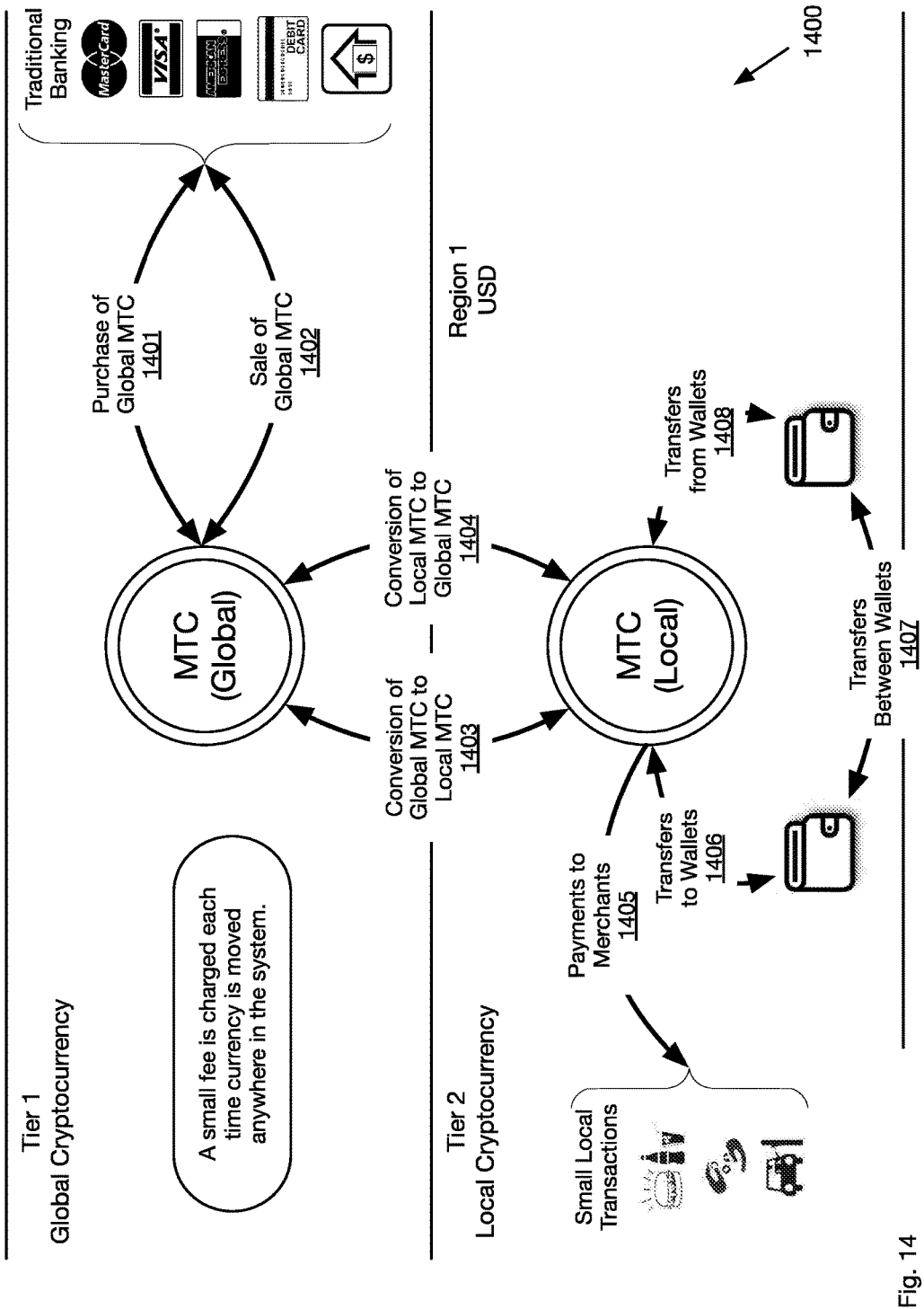
FIG. 14 is a diagram showing an exemplary fee and revenue structure for a multi-tiered cryptocurrency.

FIG. 14 is a diagram showing an exemplary fee and revenue structure 1400 for a multi-tiered cryptocurrency. Operating revenue for the multi-tiered cryptocurrency would be provided by charging a small fee each time currency is moved anywhere in the system, including, for example, purchase of the global cryptocurrency 1401 using traditional currencies, sale of the global cryptocurrency 1402 back to traditional currencies, conversion of the global cryptocurrency to lower tier cryptocurrencies 1403, conversion of a lower tier cryptocurrency back to the global cryptocurrency 1404, payments to merchants using a lower tier cryptocurrency 1405, transfers to wallets 1406, transfers between wallets 1407, and transfers from wallets 1408.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 19:
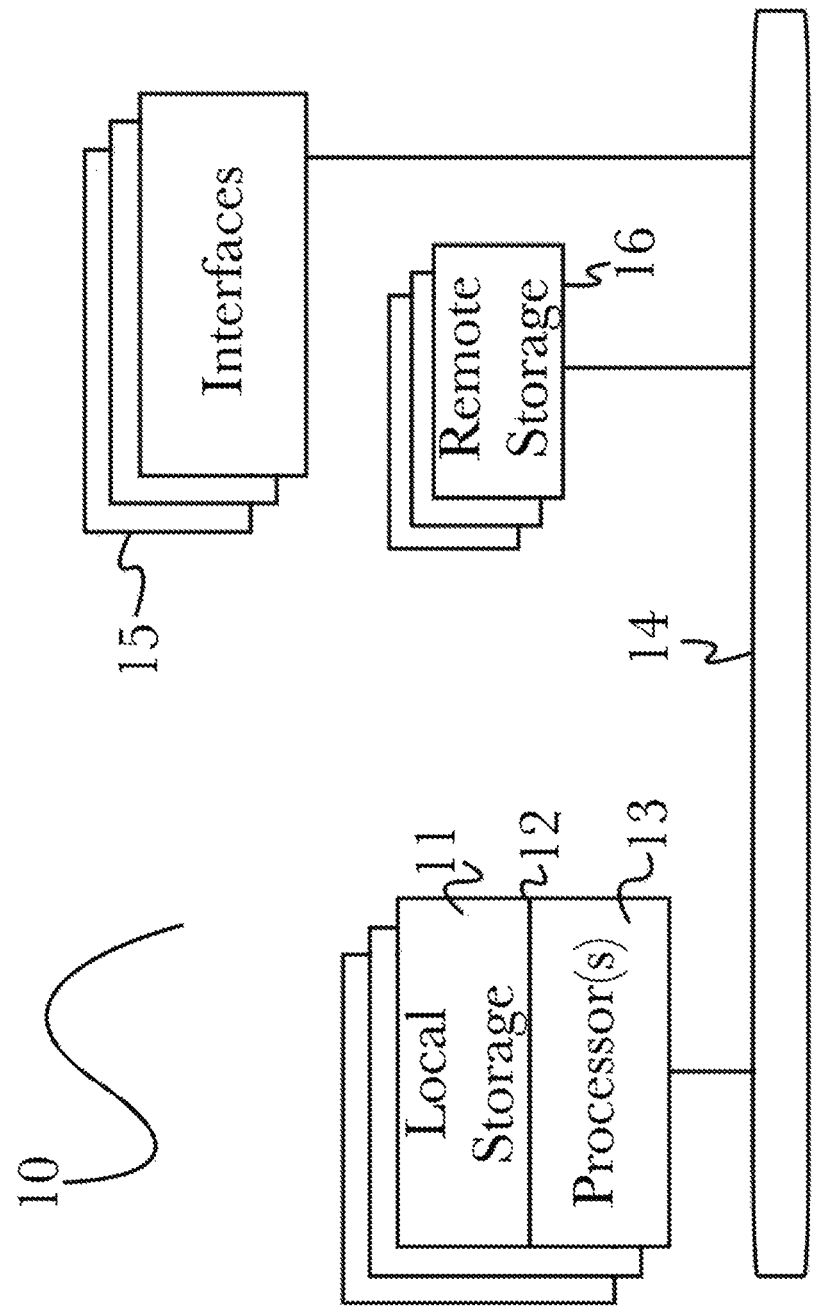
FIG. 19 is a block diagram illustrating an exemplary hardware architecture of a computing device.

Referring now to FIG. 19, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network;

other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 19 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 20:
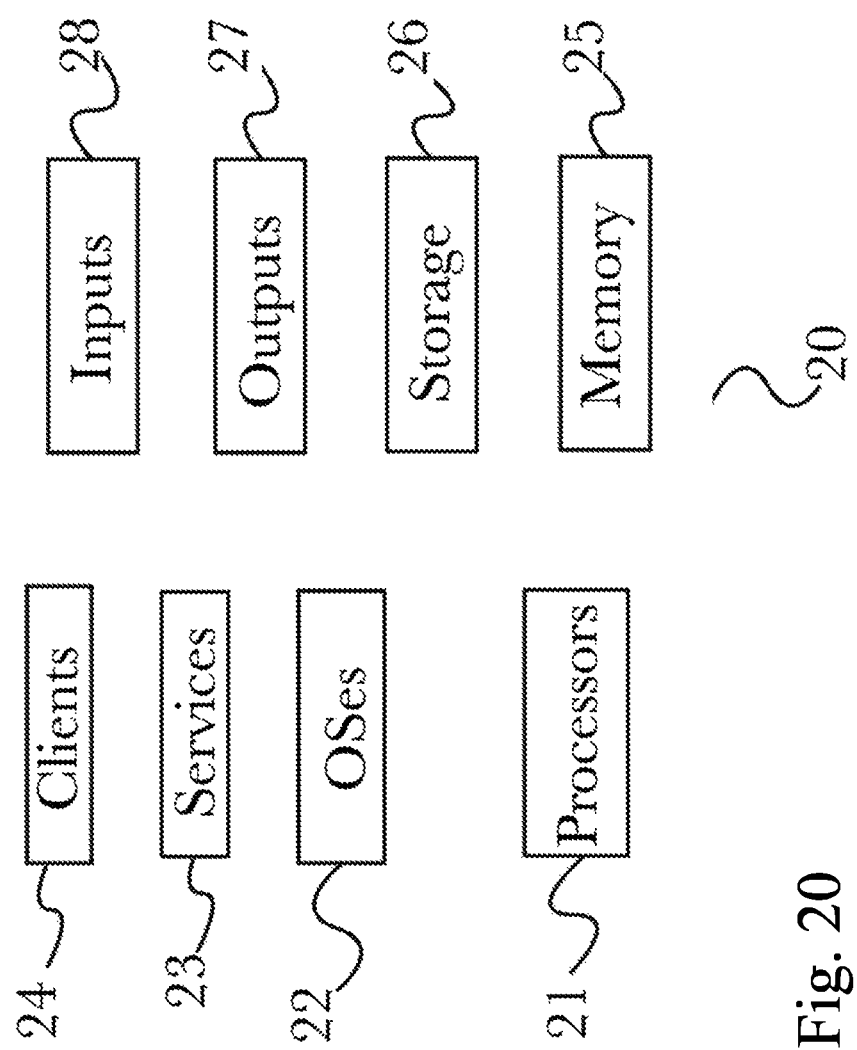
FIG. 20 is a block diagram illustrating an exemplary logical architecture for a client device.

In some aspects, systems may be implemented on a standalone computing system. Referring now to FIG. 20, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 19). Examples of storage devices 26 include flash memory, magnetic hard drive, CD-ROM, and/or the like.

Figure 21:
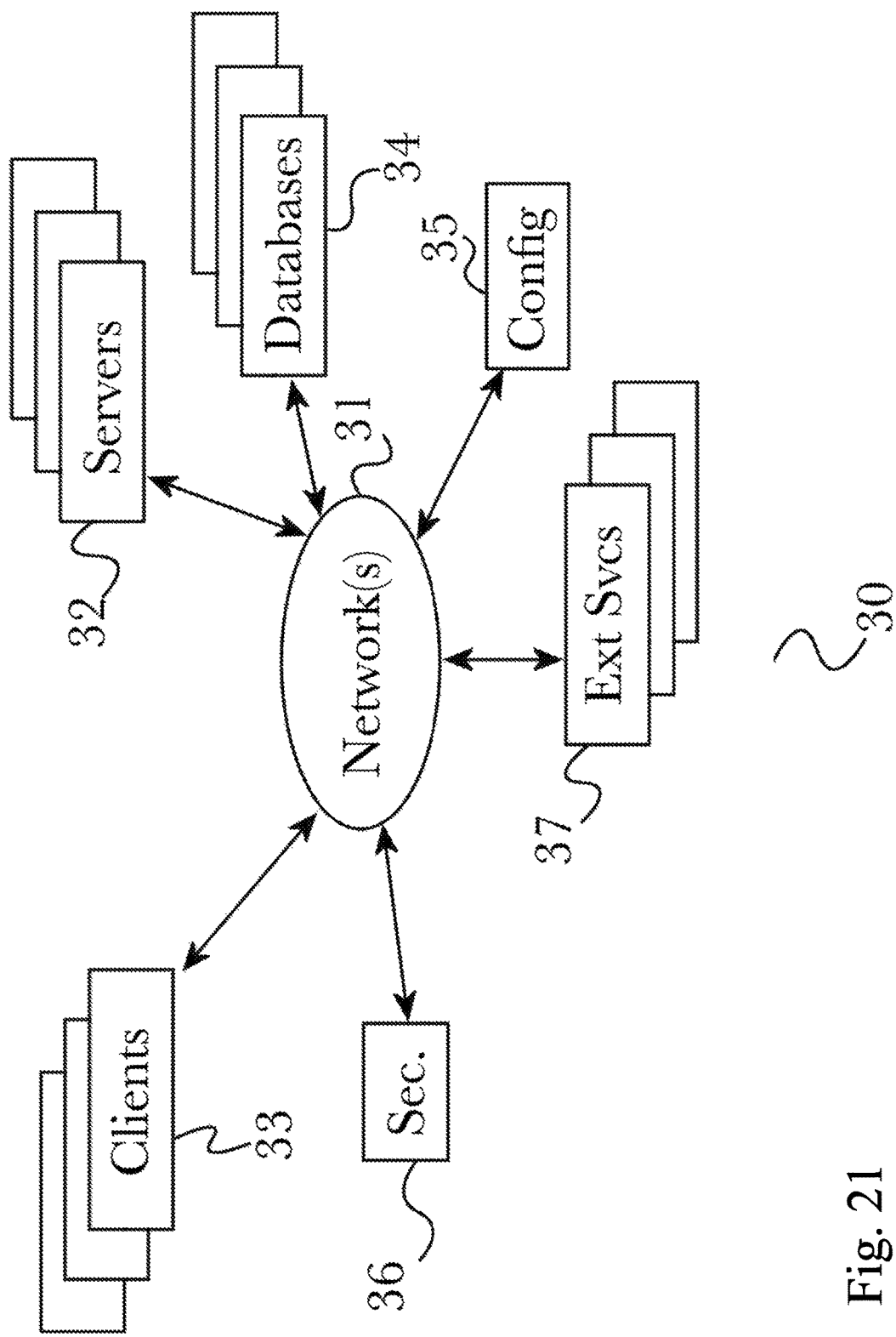
FIG. 21 is a block diagram showing an exemplary architectural arrangement of clients, servers, and external services.

In some aspects, systems may be implemented on a distributed computing network, such as one having any number of clients and/or servers. Referring now to FIG. 21, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 20. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 22:
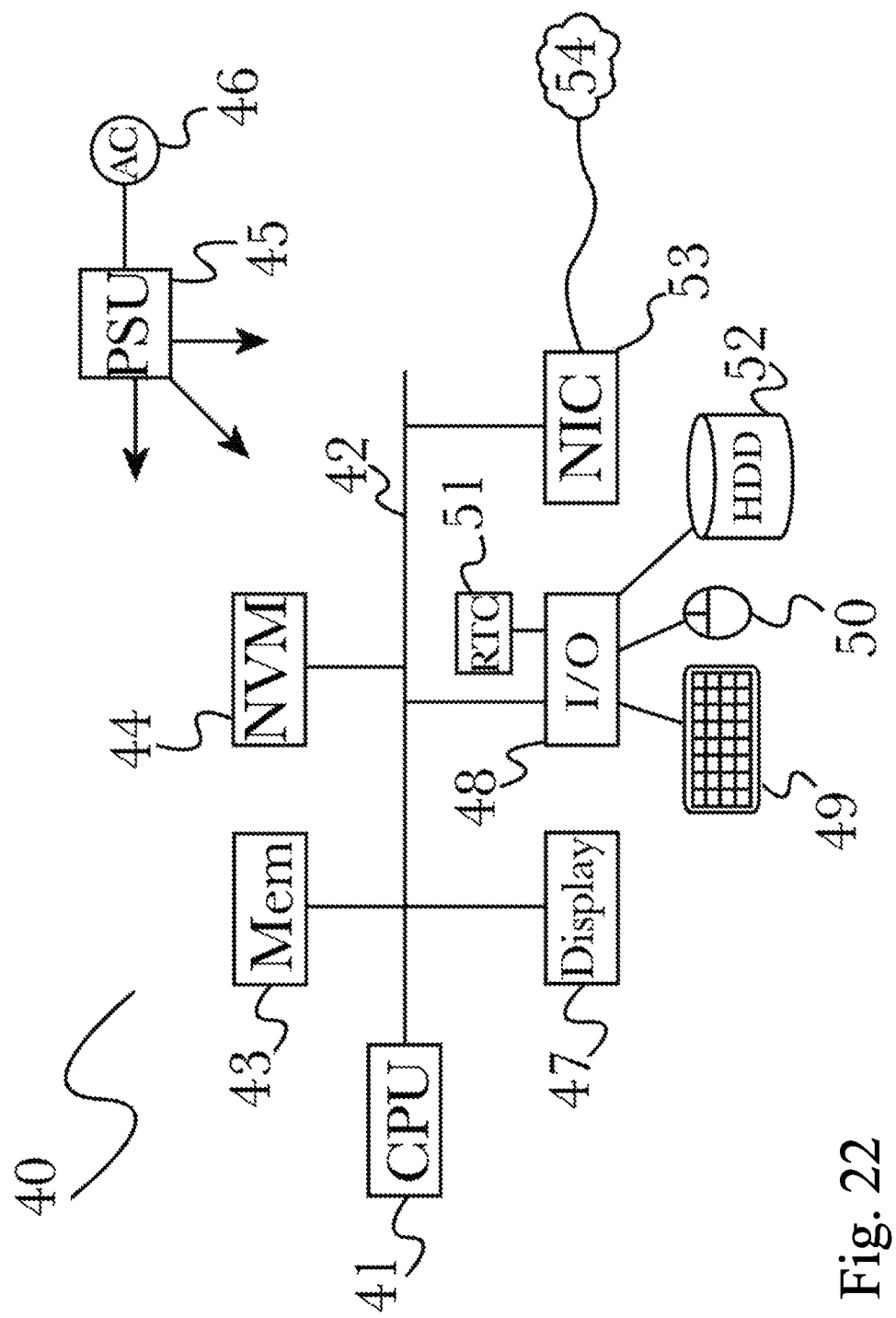
FIG. 22 is another block diagram illustrating an exemplary hardware architecture of a computing device.

FIG. 22 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In some embodiments, lower tier valuations may be in the form of digital checks (for example, cashier's checks issued by a bank or similar institution), which can be retired at the end of a redemption cycle. The advantage of this particular approach is that in most jurisdictions checks can be used without additional approvals, as checks are already permitted, and a digital, encrypted form should be recognized as valid. Further, as they are submitted in real-time on the blockchain, the risk of falsified checks is much reduced, and as they are only retired and not destroyed, an already cashed check can be immediately be identified (respectively its token on the blockchain). Such checks could be denominated in multiple currencies or asset types, as is allowable today.

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

In some use cases, certain countries may have export industries, often but not exclusively related to mineral commodities that overshadow the rest of the economy, which can cause undesired appreciation of the domestic currency. This appreciation of the domestic currency can make it difficult to export other goods and services, as they are often not related to those commodities but cannot be competitively priced due to the currency issues. By isolating the commodity business with a separate, internationally trade-able crytocurrency, in some cases also mineable, the effect of the commodity on the rest of the economy can be minimized, as only a part of the profits need to be repatriated, where as the rest can be invested globally without negatively affecting the local economy. In some instances of this use case, an exporter country may create an additional currency as a weighted basket targeting its two or three primary export market countries' currencies as the main weight, thus stabilizing the prize of its commodity for its customers, and maybe adding the currency of a main supplier country or two for capital equipment for extraction or processing that export item as well.

In another use case, the system could be used by automobile manufacturers to securely track the thousands of parts and hundreds of software updates associated with each individual car manufactured. Modern cars have on the order of 100 different embedded computer systems, each of which can be updated with different versions, updates, and patches. In addition, parts are often updated or replaced by the manufacturer over time for certain models (a particular case of this is recalls of certain parts), and the current version of such parts for each individual car can be tracked.

In another use case, the system could be used to securely track voting. Tracking voting in distributed immutable system assures highest voting integrity and provides each individual an immutable voting receipt.

In another use case, food could be securely tracked from grower to supermarket for all packaged goods. In the case of food poisoning, all sources of the food could be immediately identified.

In another use case, pharmaceuticals could be securely tracked from manufacturing to end user. This would have tremendous benefits in avoiding theft, inappropriate use, and counterfeit drugs.

In another use case, prescriptions could be securely tracked from prescribing doctor to patient. Today, patient information is totally exposed to any pharmacy technician. HIPPA violations are common. Using private certificates and immutable distributed ledgers would protect pharmacies from HIPPA violations and reduce or eliminate the possibility of prescription drug abuse.

In another use case, car parts could be securely tracked from originator to installer, reducing or eliminating the possibility of used parts being sold as new.

In another use case, the effectiveness of advertisements could be securely tracked, especially on internet-connected devices such as computers, smartphones, smart TVs, and set top boxes.

In another use case, intellectual property of all kinds (songs, movies, pictures, patents, trademarks, copyrights, etc.) could be securely tracked and infringing use immediately identified, as well as the identity of the infringer.

In another use case, product scheduled maintenance and maintenance correctness could be securely tracked for each and every part of every individual piece of equipment. This is important for consumer goods (cars, refrigerators, lawnmowers, etc.), and is critical for commercial equipment (airplanes, trains, construction equipment, elevators, etc.).

In another use case, the system could be used to replace government-issued identification cards and numbers such as driver's licenses, social security numbers, etc.

In another use case, the system could be used to issue and track insurance policies with incident tracking and payout tracking.

In another use case, the system could be used to securely submit and track documents such as tax returns, real estate recordings, court documents, and other government records.

In another use case, the system could be used to securely track payments from large scale programs such as Social Security payments, Social Security Disability payments, food stamps, etc.

The skilled person will be aware of a range of possible modifications of the various aspects described above. Accordingly, the present invention is defined by the claims and their equivalents.

What is claimed is:

1. A system for testing of divided blockchains, comprising:
   a computer network comprising a plurality of connected computer systems, each computer system comprising at least one processor, a memory, and a plurality of programming instructions stored in the memory which, when operating on the at least one processor, cause the at least one processor to:
   instantiate a plurality of blockchain nodes on at least one computer system in the computer network;
   assign one of the nodes to be the lead node for processing of blocks;
   generate or import simulated accounts, wallets, tokens, and transactions;
   load an implementation of at least one shard of a divided blockchain for testing;
   run a simulation of activity on the at least one shard of the divided blockchain using the instantiated nodes and the simulated accounts, wallets, tokens, and transactions; and
   test the performance of the simulation using at least one performance metric;
   wherein sub-divided blockchains are maintained within at least one division of a divided blockchain, a new sub-division is created in a sub-divided blockchain once an existing sub-division reaches a pre-determined size, and older sub-divisions are consolidated after a pre-defined period of time.

2. A method for testing of divided blockchains, comprising the steps of:
   instantiating a plurality of blockchain nodes on at least one computer system in the computer network;
   assigning one of the nodes to be the lead node for processing of blocks;
   generating or import simulated accounts, wallets, tokens, and transactions;
   loading an implementation of at least one shard of a divided blockchain for testing;
   running a simulation of activity on the at least one shard of the divided blockchain using the instantiated nodes and the simulated accounts, wallets, tokens, and transactions;
   testing the performance of the simulation using at least one performance metric;
   maintaining sub-divided blockchains within at least one division of a divided blockchain;
   creating a new sub-division in a sub-divided blockchain once an existing sub-division reaches a pre-determined size; and
   consolidating older sub-divisions after a pre-defined period of time.

* * * * *